United States Patent
Kim et al.

(10) Patent No.: US 10,564,043 B2
(45) Date of Patent: Feb. 18, 2020

(54) APPARATUS AND METHOD FOR MEASURING WAVEFORM OF LIGHT WAVE BASED ON IONIZATION YIELD MODULATION

(71) Applicants: Institute for Basic Science, Daejeon (KR); Gwangju Institute of Science and Technology, Gwangju (KR)

(72) Inventors: Kyung-Taec Kim, Gwangju (KR); Chang-Hee Nam, Gwangju (KR); Seung-Beom Park, Gwangju (KR); Wo-Sik Cho, Seoul (KR); Kyung-Seung Kim, Gwangju (KR)

(73) Assignees: Institute For Basic Science, Daejeon (KR); Gwangju Institute of Science And Technology, Gwangju (KR)

( * ) Notice: Subject to any disclaimer, the term of this patent is extended or adjusted under 35 U.S.C. 154(b) by 0 days.

(21) Appl. No.: 15/982,303

(22) Filed: May 17, 2018

(65) Prior Publication Data
US 2018/0266891 A1    Sep. 20, 2018

Related U.S. Application Data

(63) Continuation of application No. PCT/KR2016/013373, filed on Nov. 18, 2016.

(30) Foreign Application Priority Data

Nov. 18, 2015 (KR) .......................... 10-2015-0161981
Dec. 3, 2015 (KR) .......................... 10-2015-0171666

(51) Int. Cl.
*G01J 11/00* (2006.01)
*G02B 27/14* (2006.01)
*G01J 9/02* (2006.01)

(52) U.S. Cl.
CPC .................. *G01J 11/00* (2013.01); *G01J 9/02* (2013.01); *G02B 27/14* (2013.01)

(58) Field of Classification Search
CPC .............. G01J 11/00; G01J 9/02; G02B 27/14
See application file for complete search history.

(56) References Cited

U.S. PATENT DOCUMENTS

| 3,445,668 A | 5/1969 | Armstrong |
| 4,413,905 A | 11/1983 | Holzapfel |
(Continued)

FOREIGN PATENT DOCUMENTS

| CN | 102507021 A | 6/2012 |
| CN | 103389164 A | 11/2013 |
(Continued)

OTHER PUBLICATIONS

Masanori Kaku et al. "Autocorrelation of femtosecond VUV pulses using multiphoton ionization". High Energy/Average Power Lasers and Intense Beam Applications V. Proceedings of SPIE Digital Library vol. 7915, 79150G-1. 2011.
(Continued)

*Primary Examiner* — Hwa Andrew Lee
(74) *Attorney, Agent, or Firm* — Harness, Dickey & Pierce, P.L.C.

(57) ABSTRACT

The present invention relates to a apparatus and method for measuring a waveform of a light wave. A light wave measurement apparatus according to an embodiment of the present invention includes a pulse separation unit to separate an input light wave into a fundamental pulse and a signal pulse, a time delay adjustment unit to adjust a time delay between the fundamental pulse and the signal pulse, a focusing unit to focus the fundamental pulse and the signal pulse whose time delay is adjusted on an ionization material, and an ionization yield measurement unit to measure an
(Continued)

ionization yield from electrons and/or ions generated by the focused fundamental pulse and signal pulse. The waveform of the input light wave is obtained by obtaining an ionization yield modulation changed by the signal pulse as a function of the time delay.

18 Claims, 15 Drawing Sheets

(56) References Cited

U.S. PATENT DOCUMENTS

| | | | |
|---|---|---|---|
| 4,505,587 | A | 3/1985 | Haus et al. |
| 4,681,436 | A | 7/1987 | Ching et al. |
| 4,792,230 | A | 12/1988 | Naganuma et al. |
| 4,973,160 | A | 11/1990 | Takiguchi et al. |
| 5,068,525 | A | 11/1991 | Schaefer et al. |
| 5,461,234 | A | 10/1995 | Miyazaki et al. |
| 5,530,544 | A | 6/1996 | Trebino et al. |
| 5,754,292 | A | 5/1998 | Kane et al. |
| 6,108,085 | A | 8/2000 | Sheik-Bahae |
| 6,504,612 | B2 | 1/2003 | Trebino |
| 8,525,991 | B2 | 9/2013 | Hsieh et al. |
| 8,710,440 | B2 | 4/2014 | Kiwa et al. |
| 8,735,810 | B1 | 5/2014 | Vestal |
| 9,324,545 | B2 | 4/2016 | Green et al. |
| 2009/0097514 | A1* | 4/2009 | Shah .................. G01J 11/00 372/25 |
| 2010/0053629 | A1 | 3/2010 | Kane |
| 2012/0314214 | A1* | 12/2012 | Alexander ............. G01J 3/443 356/318 |
| 2018/0266891 | A1 | 9/2018 | Kim et al. |

FOREIGN PATENT DOCUMENTS

| | | |
|---|---|---|
| CN | 103868604 A | 6/2014 |
| EP | 3382355 A1 | 10/2018 |
| JP | 2001305229 A | 10/2001 |
| JP | 3385890 B2 | 3/2003 |
| JP | 3527460 B2 | 5/2004 |
| JP | 2006126008 A | 5/2006 |
| JP | 5807957 B2 | 11/2015 |
| WO | WO-2017086752 A1 | 5/2017 |

OTHER PUBLICATIONS

D. M. Rayner et al. "Ultraviolet laser, short pulsewidth measurement by multiphoton ionization autocorrelation". AIP Review of Scientific Instruments. AIP Publishing. 1982.

International International Search Report PCT/ISA/210 for International Application No. PCT/KR2016/013373 dated Jan. 16, 2017.

Written Opinion of the International Searching Authority PCT/ISA/237 for International Application No. PCT/KR2016/013373 dated Jan. 16, 2017.

Kim, et al. "Petahertz optical oscilloscope," Nature Phonics, Advanced Online Publication, pp. 1-5, (2013).

* cited by examiner

APPARATUS AND METHOD FOR MEASURING WAVEFORM OF LIGHT WAVE BASED ON IONIZATION YIELD MODULATION

CROSS-REFERENCE TO RELATED APPLICATIONS

This application is a continuation of PCT International Application No. PCT/KR2016/013373 which has an International filing date of Nov. 18, 2016, which claims priority to Korean Application Nos. 10-2015-0161981, filed Nov. 18, 2015 and 10-2015-0171666, filed Dec. 3, 2015, the entire contents of each of which are hereby incorporated by reference.

TECHNICAL FIELD

The present invention relates to an apparatus and a method for measuring a light wave, and more particularly, to an apparatus and a method for measuring a waveform of a light wave in time domain.

BACKGROUND ART

Generally, the waveform measurement of a light wave having a pulse shape is an essential element in various applications. In order to measure the waveform of a light wave whose electric field changes over time, the amplitude and phase of the light wave should be measured in time domain or frequency domain.

According to the prior art, various methods are used to measure the light wave. One of the most widely used methods for measuring the light wave is using a harmonic radiation generated from a nonlinear material. Among them, autocorrelation is widely used.

In the autocorrelation method, an input light wave is split into two pulses using an optical interferometer, and the two pulses are recombined in a nonlinear material to generate a harmonic radiation. Since the intensity of the harmonic wave increases when two pulses overlap in time domain, the approximate pulse duration of the input light wave may be determined by measuring the intensity of the harmonic wave as a function of time delay between the two pulses.

However, according to the method using the autocorrelation, only information on the pulse duration of the light wave can be obtained. There is no information on the phase of the light wave. Therefore, the waveform of the light wave cannot be measured.

Examples of a method of measuring the amplitude and phase of a spectrum in the frequency domain include a frequency-resolved optical gating (FROG) method and a spectral phase interferometry for direct electric-field reconstruction (SPIDER) method.

In the FROG method and the SPIDER method, similar to the autocorrelation method, the input light wave is divided into two pulses using an optical interferometer, and the spectrum of the harmonic wave generated by recombining the two pulses in the nonlinear material is measured as a function of the time delay between two pulses. When using these methods, it is possible to measure the waveform of the input light wave using the pulse reconstruction algorithm.

However, since the above-described methods measure a light wave based on a harmonic wave generation in a nonlinear material, the above-described methods may be applied only to a specific wavelength that satisfies the phase matching condition of the nonlinear material.

A method for measuring the pulse duration of a light wave using ionization of a material without a wavelength limitation problem of a nonlinear material has been proposed. The conventional light wave measurement methods using multiphoton ionization are performed by dividing a light wave into two pulses and then focusing them on the ionized material and measuring the ionization yield that changes with the time delay between the two pulses. Since these methods correspond to the autocorrelation method in which the ionization yield produced by the light wave is described by multiphoton ionization, there is no information on the phase of the light wave. Therefore, the approximate pulse duration of the light wave can be measured, but the waveform of the light wave cannot be measured.

In the Attosecond streak camera method or the Petahertz optical oscilloscope method, the waveform of a light wave is measured using a high harmonic radiation. However, these methods have a disadvantage in that a complicated high harmonic generation and extreme ultraviolet measurement apparatuses are required.

As a result, the prior light wave measurement methods have the following problems.

In the autocorrelation method, the waveform of the light wave cannot be measured because information on the phase of the light wave is not provided.

Light wave measurement methods using nonlinear materials (autocorrelation method, FROG method, SPIDER method, etc.) may be applied only in a limited wavelength range.

The prior method of measuring the light wave using multiphoton ionization of materials corresponds to the autocorrelation method, so the waveform of the light wave cannot be measured.

The method using high harmonic radiation requires complicated high harmonic generation and extreme ultraviolet measurement apparatuses.

Therefore, there is a need for a technique for measuring the waveform of a light wave in time domain by using a apparatus for overcoming the above-described disadvantages with a simple structure.

DISCLOSURE OF THE INVENTION

Technical Problem

An object of the present invention is to provide a light wave measurement apparatus and method capable of accurately measuring the waveform of a light wave in time domain.

In addition, an object of the present invention is to provide a light wave measurement apparatus and method capable of measuring the waveform of a light wave without the limitation of the wavelength range occurring when the waveform is measured using a nonlinear material.

In addition, an object of the present invention is to provide a light wave measurement apparatus and method capable of measuring the waveform of a light wave without a complicated high harmonic generation apparatus and an extreme ultraviolet measurement apparatuses.

The objects of the present invention are not limited to the above-mentioned objects, and other objects and advantages of the present invention which are not mentioned may be understood by the following description and more clearly understood by the embodiments of the present invention. Furthermore, it will be apparent that the objects and advantages of the invention may be realized by the means indicated in the claims and combinations thereof.

Technical Solution

According to an embodiment of the present invention, a light wave measurement apparatus includes a pulse separation unit to separate an input light wave into a fundamental pulse and a signal pulse, a time delay adjustment unit to adjust a time delay between the fundamental pulse and the signal pulse, a focusing unit to focus the fundamental pulse and the signal pulse whose time delay is adjusted on an ionization material, and an ionization yield measurement unit to measure an ionization yield from electrons and/or ions generated by the focused fundamental pulse and signal pulse, obtaining a waveform of an input light wave by obtaining an ionization yield modulation changed by a signal pulse as a function of the time delay.

Also, in other embodiment of the light wave measurement apparatus, the waveform of the input light wave may be obtained from a waveform of a signal pulse calculated using [Equation 3] below.

$$\delta N(\tau) = N(\tau) - N_0 = \int_{-\infty}^{+\infty} g(t-\tau) E_s(t) dt \qquad \text{[Equation 3]}$$

In [Equation 3], $\delta N(\tau)$ is an ionization yield modulation changed by a signal pulse as a function of a time delay $\tau$, $N(\tau)$ is an ionization yield measured as a function of a time delay $\tau$, $N_0$ is an ionization yield generated by a fundamental pulse only, $g(t-\tau)$ is a derivative value of an ionization rate with respect to an electric field strength of a fundamental pulse $F(t-\tau)$, and $E_s(t)$ is a waveform of a signal pulse.

Also, in another embodiment of the light wave measurement apparatus, if a pulse duration of a fundamental pulse reacting with an ionization material is less than 2.5 times a transform-limited pulse duration $\Delta TL$ of a fundamental pulse, the waveform of the input light wave is obtained from a waveform of a signal pulse calculated using [Equation 4] below.

$$\delta N(\tau) \propto E_s(\tau) \qquad \text{[Equation 4]}$$

In an embodiment, the ionization material is made of a gas.

Also, in an embodiment, the ionization material is made of a metal body having a sharp-pointed end.

Also, in an embodiment, the ionization material is made of a nanostructure disposed on a substrate.

Also, in another embodiment, the light wave measurement apparatus includes at least one pulse strength adjustment unit to adjust the field strength of the fundamental pulse and/or the signal pulse with a predetermined ratio.

Also, in another embodiment, the light wave measurement apparatus includes at least one dispersion adjustment unit to adjust the dispersion of the fundamental pulse and/or the signal pulse.

Also, in another embodiment, the pulse separation unit of the light wave measurement apparatus is a beam splitter for separating the input light wave into the fundamental pulse and the signal pulse with a predetermined ratio.

Also, in another embodiment, the time delay adjustment unit of the light wave measurement apparatus includes at least one reflective mirror, and the time delay adjustment unit may adjust a position of the at least one reflective mirror to adjust a time delay between the fundamental pulse and the signal pulse.

Also, in another embodiment, the light wave measurement apparatus of the light wave measurement apparatus includes a pulse coupling unit to make the fundamental pulse and the signal pulse being directed along the same path.

Also, in another embodiment, the pulse separation unit of the light wave measurement apparatus includes a first region and a second region divided with a predetermined ratio, the first region reflects a portion of the input light wave to generate a fundamental pulse, the second region reflects a portion of the input light wave to generate a signal pulse, and the time delay adjustment unit adjusts a time delay between the fundamental pulse and the signal pulse by moving a position of the first region or the second region.

Also, in another embodiment, the light wave measurement apparatus includes a second pulse separation unit to separate the fundamental pulse into a first fundamental pulse and a second fundamental pulse, a second focusing unit to focus the second fundamental pulse on a second ionization material, and a second ionization yield measurement unit to measure an ionization yield from electrons and/or ions generated by the second fundamental pulse focused by the second focusing unit, wherein the focusing unit focuses the first fundamental pulse and the signal pulse on an ionization material, and the ionization yield measurement unit measures an ionization yield from electrons and/or ions generated by the focused first fundamental pulse and the signal pulse, and a waveform of the input light wave is obtained by obtaining a normalized ionization yield modulation, which is obtained from an ionization yield obtained by using the first fundamental pulse and the signal pulse in the ionization yield measurement unit and an ionization yield obtained by using only the second fundamental pulse in the second ionization yield measurement unit, as a function of the time delay.

Also, in another embodiment, the light wave measurement apparatus includes a second focusing unit to focus the fundamental pulse, which is focused on the ionization material and generates electrons and/or ions, on a focus region having a second ionization material, and a second ionization yield measurement unit to measure an ionization yield from the electrons and/or ions generated by the fundamental pulse focused by the second focusing unit, wherein a waveform of the input light wave is obtained by obtaining a normalized ionization yield modulation, which is obtained from an ionization yield obtained by using the first fundamental pulse and the signal pulse in the ionization yield measurement unit and an ionization yield obtained by using only the fundamental pulse in the second ionization yield measurement unit, as a function of the time delay.

Also, according to another embodiment of the present invention, a light wave measurement method includes separating an input light wave into a fundamental pulse and a signal pulse, adjusting a time delay between the fundamental pulse and the signal pulse, focusing the fundamental pulse and the signal pulse whose time delay is adjusted on an ionization material, measuring an ionization yield from electrons and ions generated by the focused fundamental pulse and the signal pulse, and obtaining an ionization yield modulation changed by the signal pulse as a function of the time delay to obtain a waveform of an input light wave.

Also, in another embodiment of the light wave measurement method, the waveform of the input light wave is obtained from a waveform of a signal pulse calculated using [Equation 3] above.

Also, in another embodiment of the light wave measurement method, if a pulse duration of a fundamental pulse reacting with an ionization material is less than 2.5 times a transform-limited pulse duration $\Delta TL$ of a fundamental pulse, the waveform of the input light wave is obtained from a waveform of a signal pulse calculated using [Equation 4] above.

In an embodiment, the ionizing material is made of a gas.

Also, in an embodiment, the ionizing material is made of a metal body having a sharp-pointed end.

Also, in an embodiment, the ionizing material is made of a nanostructure disposed on a substrate.

Also, in another embodiment, the method includes adjusting the field strength of the fundamental pulse and/or the signal pulse with a predetermined ratio.

Also, in another embodiment, the method includes adjusting the dispersion of the fundamental pulse and/or the signal pulse.

Also, in another embodiment of the light wave measurement method, the separating of the input light wave into the fundamental pulse and the signal pulse is performed by a beam splitter for separating the input light wave into the fundamental pulse and the signal pulse with a predetermined ratio.

Also, in another embodiment of the light wave measurement method, the adjusting of the time delay between the fundamental pulse and the signal pulse includes adjusting a time delay between the fundamental pulse and the signal pulse by adjusting a position of at least one reflective mirror.

Also, in another embodiment, the method includes making the fundamental pulse and the signal pulse being directed along the same path.

Also, in another embodiment, the method includes separating the fundamental pulse into a first fundamental pulse and a second fundamental pulse, focusing the second fundamental pulse on the second ionization material, and measuring an ionization yield from electrons and/or ions generated by the focused second fundamental pulse, wherein the focusing of the fundamental pulse and the signal pulse whose time delay is adjusted on the ionization material includes focusing the first fundamental pulse and the signal pulse on the ionization material, the measuring of the ionization yield from the electrons and the ions generated by the focused fundamental pulse and the signal pulse includes measuring an ionization yield from electrons and ions generated by the first fundamental pulse and the signal pulse, and the obtaining of the waveform of the input light wave includes obtaining a waveform of the input light wave by obtaining a normalized ionization yield modulation, which is obtained from an ionization yield obtained by using the first fundamental pulse and the signal pulse and an ionization yield obtained by using only the second fundamental pulse, as a function of the time delay.

Also, according to another embodiment of the present invention, a light wave measurement apparatus includes a pulse separation unit to separate an input light wave into a fundamental pulse and a signal pulse and focus the fundamental pulse and the signal pulse on an ionization material, a time delay adjustment unit to adjust a time delay between the fundamental pulse and the signal pulse, and an ionization yield measurement unit to measure an ionization yield from electrons and/or ions generated by the focused fundamental pulse and the signal pulse, obtaining a waveform of an input light wave by obtaining an ionization yield modulation changed by the signal pulse as a function of the time delay.

Also, in another embodiment of the light wave measurement apparatus, the pulse separation unit includes a first region and a second region divided with a predetermined ratio, the first region reflects a portion of the input light wave to generate a fundamental pulse, the second region reflects a portion of the input light wave to generate a signal pulse, and the time delay adjustment unit adjusts a time delay between the fundamental pulse and the signal pulse by moving a position of the first region or the second region.

Also, in another embodiment, the light wave measurement apparatus includes a second focusing unit to focus the fundamental pulse, which is focused on the ionization material and generates electrons and/or ions, on a focus region having a second ionization material, and a second ionization yield measurement unit to measure an ionization yield from electrons and/or ions generated by the fundamental pulse focused by the second focusing unit, wherein a waveform of the input light wave is obtained by obtaining a normalized ionization yield modulation, which is obtained from an ionization yield obtained by using the first fundamental pulse and the signal pulse in the ionization yield measurement unit and an ionization yield obtained by using only the fundamental pulse in the second ionization yield measurement unit, as a function of the time delay.

Advantageous Effects

According to the present invention, there is an advantage that the waveform of a light wave can be accurately measured in time domain.

Also, according to the present invention, it is possible to measure the waveform of a light wave without limitation of a wavelength range that occurs when the waveform is measured using a nonlinear material.

Also, according to the present invention, it is possible to measure the waveform of a light wave without a complicated high harmonic generation apparatus and an extreme ultraviolet ray measurement apparatus.

MODE FOR CARRYING OUT THE INVENTION

Figure 1:
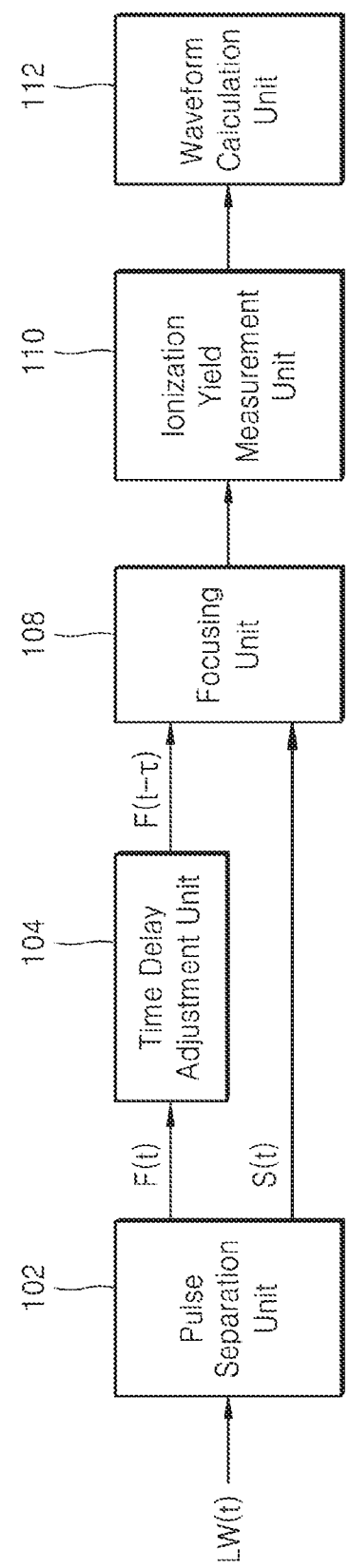
FIG. 1 is a configuration diagram of a light wave measurement apparatus according to an embodiment of the present invention.

The above objects, features and advantages will be described in detail below with reference to the accompanying drawings, and accordingly, those skilled in the art may easily implement the technical idea of the present invention. In describing the present invention, when it is determined that the detailed description of the known technology related to the present invention may unnecessarily obscure the scope of the present invention, detailed description thereof will be omitted. Hereinafter, preferred embodiments of the present invention will be described in detail with reference to the accompanying drawings. In the drawings, the same reference numerals are used to indicate the same or similar components.

The 'ionization' phenomenon described in the description of the present invention may be generally divided into multi-photon ionization or tunneling ionization by a Keldysh parameter value $\gamma$. The Keldysh parameter is defined as $\gamma = \omega\sqrt{2I_p}/E_0$ where $\omega$ is the angular frequency of the light wave, $E_0$ is the maximum amplitude of the electric field of the light wave, and $I_p$ is the ionization potential of the ionization material.

In the description of the present invention, when the Keldysh parameter value $\gamma$ is smaller than 6 ($\gamma < 6$), it is regarded as a tunneling ionization region, and unless otherwise stated, 'ionization' means the separation of electrons and/or ions from ionization materials by tunneling ionization phenomenon in which ionization materials (gases, liquids, solids, or nanostructures) reacts with light waves.

In describing the present invention, 'waveform' means a shape in which an electric field changes with time. However, the carrier envelope phase (CEP) value of a measured signal pulse may be different from the actual value.

In describing the present invention, the 'ionization yield modulation' means the amount of change in ionization yield that is changed by the signal pulse.

FIG. 1 is a configuration diagram of a light wave measurement apparatus according to an embodiment of the present invention.

Referring to FIG. 1, a light wave measurement apparatus according to an embodiment of the present invention includes a pulse separation unit 102, a time delay adjustment unit 104, a focusing unit 108, and an ionization yield measurement unit 110 to obtain the waveform of the input light wave.

The pulse separation unit 102 receives a light wave to be measured, that is, an input light wave LW(t), and separates the input light wave LW(t) into two pulses with a predetermined electric field strength ratio. Here, a pulse having a relatively strong field strength is referred to as a fundamental pulse F(t), and a pulse having a relatively weak field strength is referred to as a signal pulse S(t). In addition, the predetermined electric field strength ratio includes a minimum ratio and a maximum ratio. That is, the pulse separation unit 102 separates the input light wave LW(t) so that the field strength of the signal pulse S(t) is between the minimum and the maximum ratio of the field strength of the fundamental pulse F(t).

In the present invention, the ionization yield modulation changed by the signal pulse S(t) is measured based on electrons and/or ions generated by reacting the fundamental pulse F(t) and the signal pulse S(t) with an ionization material. At this time, in order for the ionization yield modulation changed by the signal pulse S(t) to be accurately measured, the electric field of the signal pulse S(t) that reacts with the ionization material needs to be sufficiently strong so as not to be affected by noise caused by external environmental factors when measuring the ionization yield. In the present invention, the minimum ratio means a ratio at which the electric field strength of the signal pulse S(t) reacting with the ionization material has a minimum field strength that is not affected by noise caused by external environmental factors in the measurement of the ionization yield.

On the other hand, in the process of deriving the formula for measuring the ionization yield to be described later, both the electric field strength of the fundamental pulse F(t) and the electric field strength of the signal pulse S(t) are considered, and at this time, if the electric field strength of the signal pulse S(t) is sufficiently weaker than that of the fundamental pulse F (t), the ionization yield produced by the fundamental pulse F(t) may be approximated. (i.e., approximation from [Equation 1] to [Equation 2]) In the present invention, the maximum ratio means a rate that makes the electric field strength of the signal pulse S(t) sufficiently small so that the approximation as described above is possible.

For example, if the minimum ratio is 0.1% and the maximum ratio is 20%, the pulse separation unit 102 separates the input light wave LW(t) so that the field strength of the signal pulse S(t) is between 0.1% and 20% of that of the fundamental pulse F(t).

Accordingly, the field strength of the signal pulse S(t) through the pulse separation unit 102 becomes weaker than that of the fundamental pulse F(t).

Referring to FIG. 1 again, the time delay adjustment unit 104 adjusts the relative time delay between the fundamental pulse F(t) and the signal pulse S(t). For example, the time delay adjustment unit 104 outputs a time-delayed fundamental pulse F (t−τ) by delaying the fundamental pulse F(t) by a time delay τ as shown in FIG. 1. In one embodiment of the present invention, the time delay adjustment unit 104 may output a time-delayed fundamental pulse F(t−τ) while changing the time delay τ at regular intervals.

Furthermore, FIG. 1 shows an embodiment in which the time delay adjustment unit 104 delays and outputs the fundamental pulse F(t) by the time delay τ. However, in another embodiment of the present invention, the time delay adjustment unit 104 may delay and output the signal pulse S(t) by the time delay τ. In this case, the fundamental pulse F(t) is outputted without delay. Hereinafter, based on an embodiment in which the time delay adjustment unit 104 delays and outputs the fundamental pulse F(t) by the time delay τ, the present invention is described.

Referring again to FIG. 1, the focusing unit 108 focuses the time-delayed fundamental pulse F(tτ) and the signal pulse S(t) on the focus region.

Referring again to FIG. 1, the ionization yield measurement unit 110 measures an ionization yield from the electrons and/or ions generated by the fundamental pulse F(t−τ) and the signal pulse S(t). In one embodiment of the present invention, the ionization yield measurement unit 110 measures the magnitude of the current flowing to the electrode by the electrons and/or ions generated by the fundamental pulse F(t−τ) and the signal pulse S(t), and calculates the ionization yield based on the magnitude of the measured current. At this time, a voltage of a predetermined magnitude may be applied to the electrode for collection of electrons and/or ions.

Referring again to FIG. 1, the light wave measurement apparatus of the present invention may acquire the waveform of the input light wave based on the ionization yield modulation measured with time delay by the ionization yield measurement unit 110.

Figure 2:
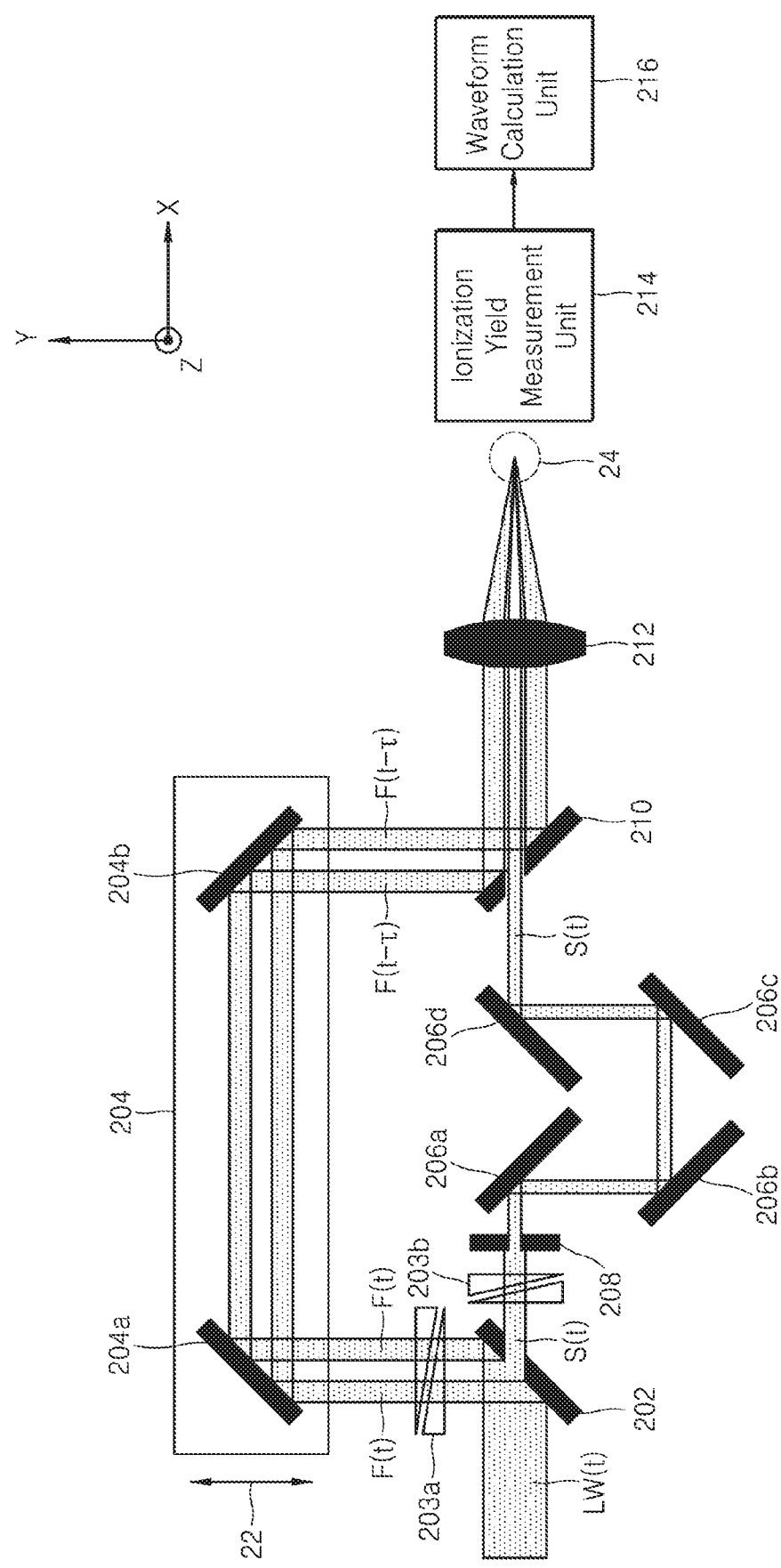
FIG. 2 is a configuration diagram of a light wave measurement apparatus according to another embodiment of the present invention.

FIG. 2 is a configuration diagram of a light wave measurement apparatus according to another embodiment of the present invention. Hereinafter, the light wave measurement process by the light wave measurement apparatus according to the present invention will be described in detail with reference to FIG. 2.

Referring to FIG. 2, the input light wave LW(t) is incident on the pulse separation unit 202. In the embodiment of FIG. 2, a mirror with a hole in certain area is used as a pulse separation unit 202. Some light waves of the incident input light wave LW(t) pass through the hole formed in the pulse separation unit 202, and thus the light wave passing through the hole is the signal pulse S(t). Also, some of the incident light waves LW(t) are reflected by the pulse separation unit 202, and the reflected light wave is the fundamental pulse F(t).

In FIG. 2, the size of the hole in the mirror may be set so that the field strength of the signal pulse S(t) passing through the hole is between the minimum ratio and the maximum ratio of that of the fundamental pulse F(t). That is, the field strength of the signal pulse S(t) may be determined in advance to be a ratio (e.g., 5%) between a minimum ratio (e.g., 0.1%) and a maximum ratio (e.g., 20%) of the fundamental pulse F(t).

In FIG. 2, a fundamental pulse and a signal pulse are separated by using a beam splitter having a perforated mirror shape. In some embodiments, other type of beam splitters may be used to separate the light wave in space. In the present invention, the beam splitter generally refers to an optical apparatus that separates a light wave in space, such as a glass substrate coated with a multilayer thin film that reflects, transmits or passes a part of a light wave and reflects, transmits or passes another part of the light wave, a perforated mirror, or a plurality of mirrors.

Referring to FIG. 2, according to the embodiment, dispersion control units 203a and 203b may be constituted by an optical apparatus such as a glass wedge pair, so that it is possible to adjust the dispersion of the fundamental pulse F(t) and/or the signal pulse S (t) separated from the pulse separation unit 202. When adjusting the dispersion values of the fundamental pulse F(t) and/or the signal pulse S(t) has the advantage that the pulse duration and pulse shape may be changed. In addition, there is also an advantage in that it is possible to compensate for dispersion differences of different optical paths. However, the dispersion adjustment units 203a and 203b are not necessarily required and may be omitted depending on the embodiment.

In addition, according to the embodiment, a pulse strength adjustment unit 208 may be provided. After making the signal pulse strength more than necessary in the pulse separation unit 202, in addition, if a pulse strength adjustment unit 208 is constructed using a apparatus such as an iris, there is an advantage that the field strength of the signal pulse S(t) may be continuously set between the minimum rate and the maximum rate of the fundamental pulse F(t). Further, although not shown in FIG. 2, a pulse strength adjustment unit for adjusting the field strength of the fundamental pulse F(t) may be further added. However, the pulse strength adjustment unit 208 is not absolutely necessary and may be omitted, depending on the embodiment.

The signal pulse S(t) provided from the pulse strength adjustment unit 208 is reflected by a first mirror 206a, a second mirror 206b, a third mirror 206c, and a fourth mirror 206d to compensate the optical path difference with respect to the fundamental pulse F(t).

Meanwhile, the fundamental pulse F(t) provided from the dispersion adjustment unit 203a is incident on the time delay adjustment unit 204. The fundamental pulse F(t) is reflected by the fifth mirror 204a and the sixth mirror 204b in the time delay adjustment unit 204 and is incident on the pulse coupling unit 210. The time delay adjustment unit 204 moves the position of the fifth mirror 204a and the sixth mirror 204b in the direction of the arrow so that the output time of the fundamental pulse F(t) is delayed by the delay time τ. Therefore, the fundamental pulse passing through the time delay adjustment unit 204 is expressed as F(t−τ).

In the embodiment of FIG. 2, a parallel movement stage is used as the time delay adjustment unit 204. The parallel movement stage is movable in the direction of arrow 22 and the time delay τ of the fundamental pulse F(t) may be adjusted according to the movement distance and direction of the parallel movement stage.

The signal pulse S(t) incident on the pulse coupling unit 210 passes through the hole in the pulse coupling unit 210 as it is. In addition, the fundamental pulse F(t−τ) incident on the pulse coupling unit 210 is reflected by the pulse coupling unit 210 and has a path identical to the signal pulse S(t).

In the embodiment of FIG. 2, a beam splitter having a hole in a certain area identical to the pulse separation unit 102 is used as the pulse coupling unit 210. Depending on the embodiment, other types of beam splitters may be used as the pulse coupling unit 210.

For reference, in the embodiment of FIG. 2, since the path of the fundamental pulse F(t−τ) passing through the time delay adjustment unit 204 and that of the signal pulse S(t) applied from the mirror 206d for adjusting the optical path are different from each other, the pulse coupling unit 210 is used to make the two pulses being directed along the same path. However, according to an embodiment, when the fundamental pulse F(t−τ) reaching the focusing unit 212 and the signal pulse S(t) already travel along the same path, the pulse coupling unit 210 may be omitted.

Referring again to FIG. 2, the fundamental pulse F(t−τ) and the signal pulse S(t) provided from the pulse coupling unit 210 are incident on the focusing unit 212.

In the embodiment of FIG. 2, a focusing lens having a predetermined focal length is used as the focusing unit 212. Depending on the embodiment, a focusing mirror may be used as the focusing unit 212. The focusing unit 212 focuses the fundamental pulse F(t−τ) and the signal pulse S(t) on the focus region 24.

The fundamental pulse F(t−τ) and the signal pulse S(t) focused on the focus region 24 react with the ionization material present in the focus region 24. The ionization material present in the focus region is a substance that generates electrons and/or ions by the interaction with a light wave, and may be a gas, a liquid, a solid or a nanostructure.

Hereinafter, the type of ionization material present in the focus region 24 and the configuration of the ionization yield measurement unit 214 will be described in detail with reference to FIGS. 3 to 5.

Figure 3:
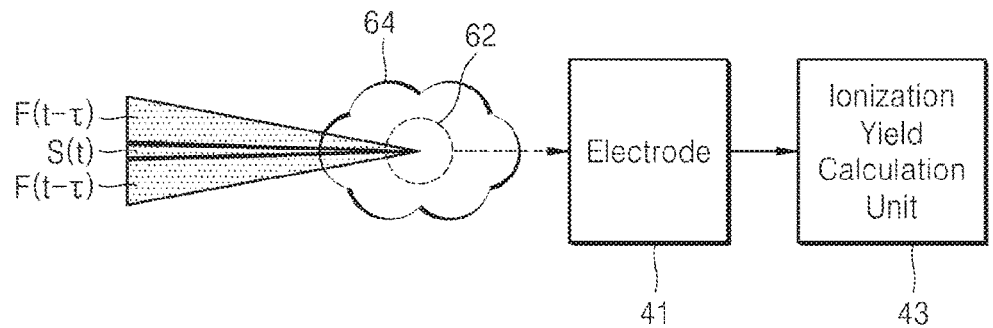
FIG. 3 is a configuration diagram of an ionization yield measurement unit when a gas is used as an ionization material in an embodiment of the present invention.

FIG. 3 is a configuration diagram of an ionization yield measurement unit when a gas is used as an ionization material in an embodiment of the present invention.

In the embodiment of FIG. 3, a gas 64 as an ionization material is present in a focus region 62 on which the fundamental pulse F(t−τ) and the signal pulse S(t) are focused. The gas 64 may be present in the atmosphere in an open space. According to the embodiment, a closed space is formed in the focus region 62, and it is possible to inject or spray the gas 64 having a predetermined pressure into the closed space after making it into a vacuum state.

An electrode 41 is disposed adjacent to the focus region 62. When the fundamental pulse F(t−τ) and the signal pulse S(t) are focused on the ionization material in the focus region 62, electrons and/or ions are generated by the fundamental pulse F(t−τ) and the signal pulse S(t). The electrons or ions generated in such a way are collected through the electrode 41.

The electrode 41 is made of two conductive materials (e.g., metal). Also, in order to collect the generated electrons and/or ions on the electrode and generate an electrical signal, a voltage of a predetermined magnitude is applied between the two electrodes 41. Accordingly, when the fundamental pulse F(t−τ) and the signal pulse S(t) are focused on the ionization material, a current due to electrons and/or ions flows between the electrodes 41.

The ionization yield calculation unit 43 calculates an amount of electrons and/or ions generated in the ionization material, that is, an ionization yield, based on the magnitude of the current generated as electrons and/or ions generated from the ionization material are collected on the electrode 41. Since a certain relationship is established between the amount of electrons and/or ions generated by the fundamental pulse F(t−τ) and the signal pulse S(t) and the magnitude of the current flowing through the electrode 41, the ionization yield calculation unit 43 may calculate the ionization yield based on the magnitude of the measured current based on the predetermined relational expression.

Meanwhile, although not shown in the drawings, to perform current measurements more precisely, an amplification unit (not shown) for amplifying the magnitude of the current generated in the electrode may be connected between the electrode 41 and the ionization yield calculation unit 43.

Figure 4:
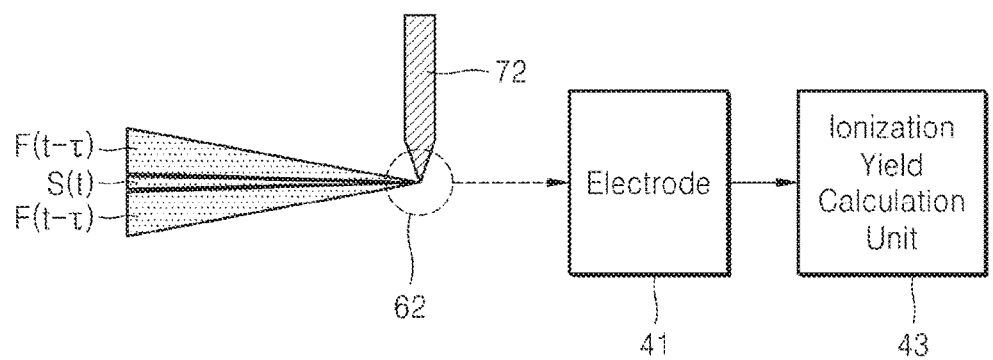
FIG. 4 is a configuration diagram of an ionization yield measurement unit when a metal body having a sharp-pointed end is used as an ionization material in an embodiment of the present invention.

FIG. 4 is a configuration diagram of an ionization yield measurement unit when a metallic body having a sharp-pointed end is used as an ionization material in an embodiment of the present invention.

In the embodiment shown in FIG. 4, a metal body 72 having a sharp-pointed end is used as the ionization material. Thus, the end of the metal body 72 is disposed in the focus region 62. As in the present embodiment, if the metal body 72 having a sharp-pointed end is used, since the strength of the electric field at the terminal becomes strong, it is more advantageous for electron and/or ion formation.

As shown in FIG. 4, when the metal body 72 is used as an ionization material, it may be used as a part of the electrode 41.

Figure 5:
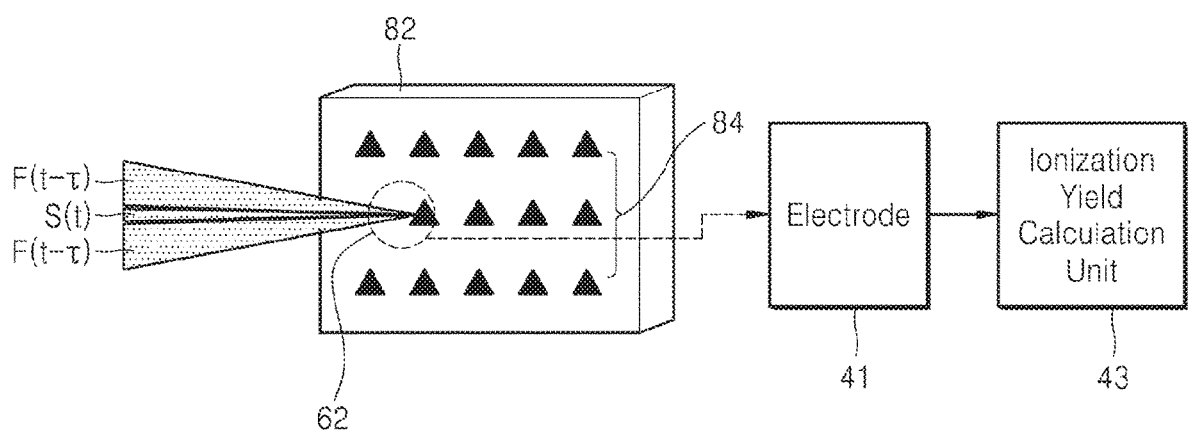
FIG. 5 is a configuration diagram of an ionization yield measurement unit when a metal nanostructure is used as an ionization material in an embodiment of the present invention.
Figure 6:
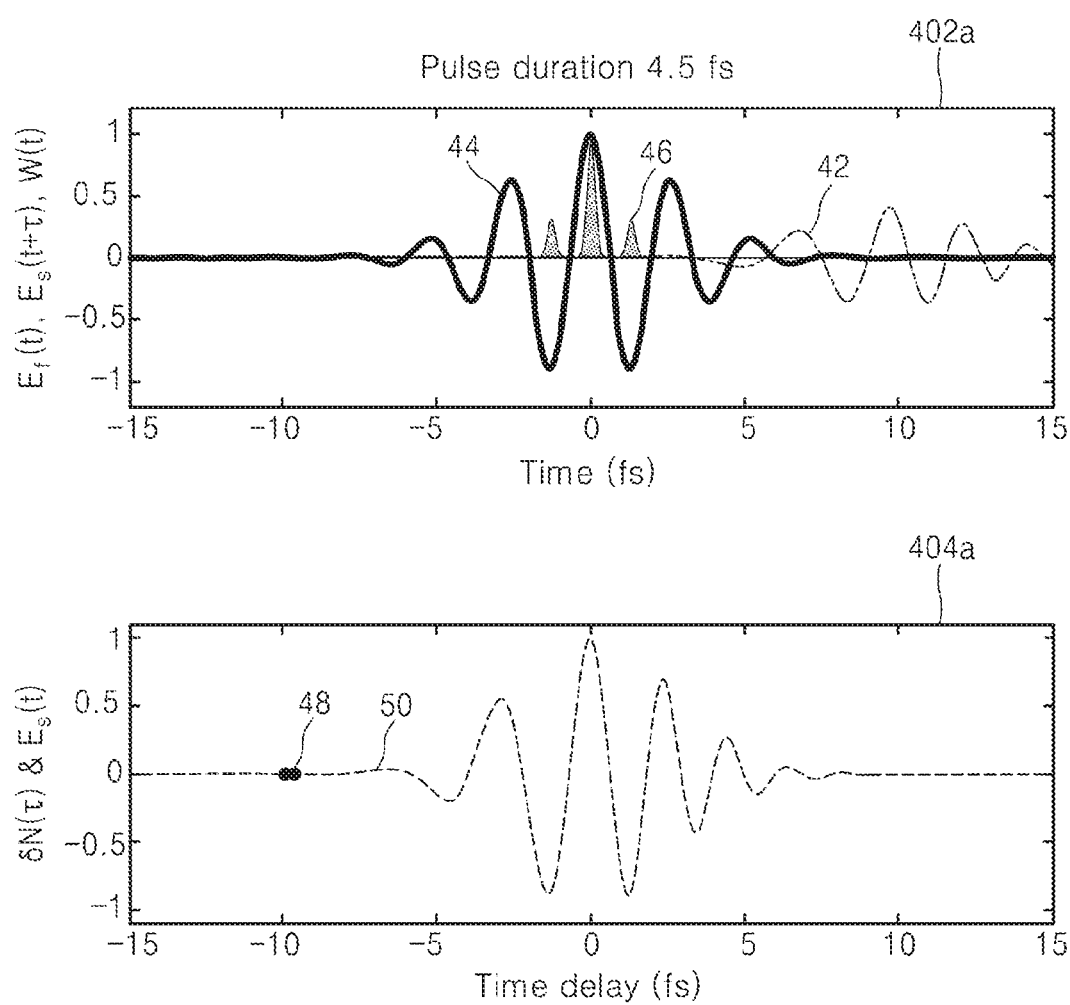
FIGS. 6 to 10 are graphs illustrating a process of obtaining a waveform of a signal pulse from an ionization yield modulation measured as a function of a time delay in an embodiment of the present invention.
Figure 7:
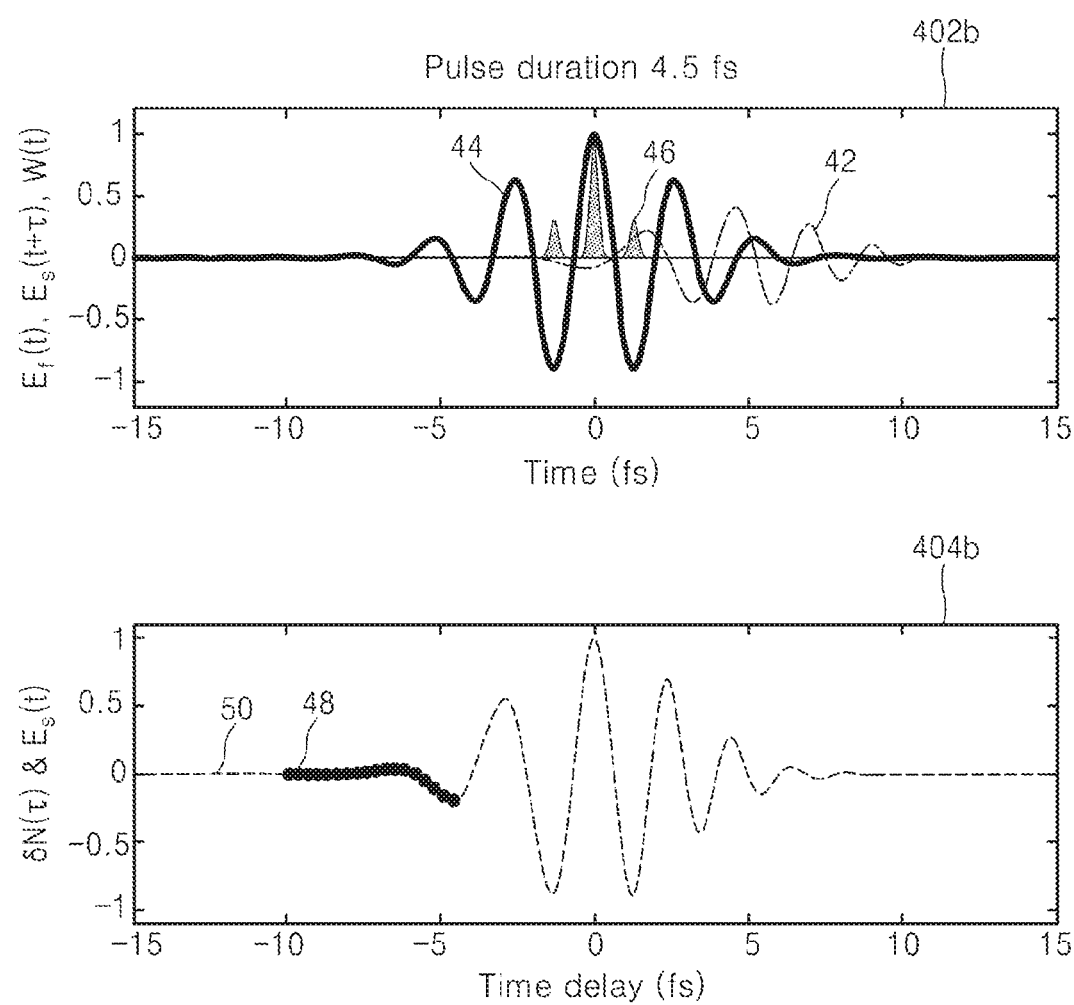
Figure 8:
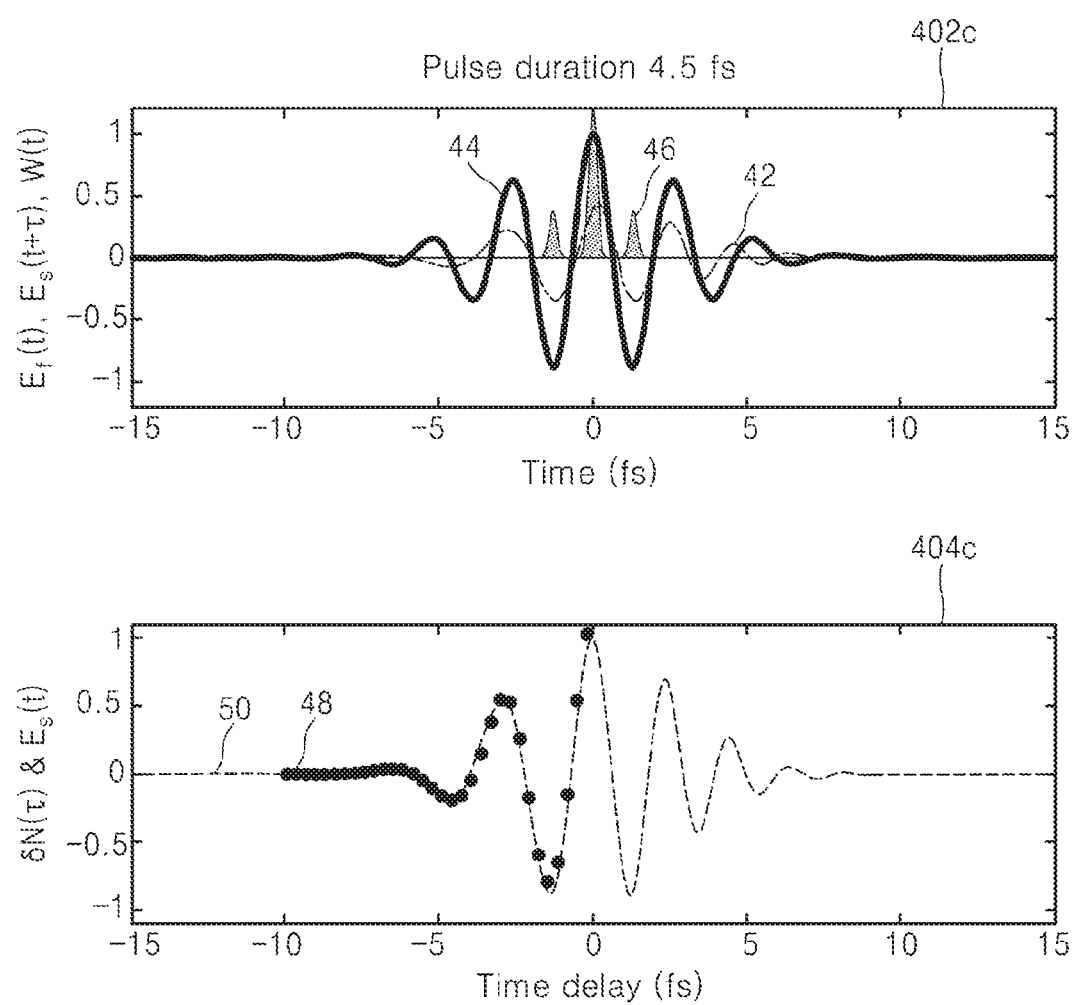
Figure 9:
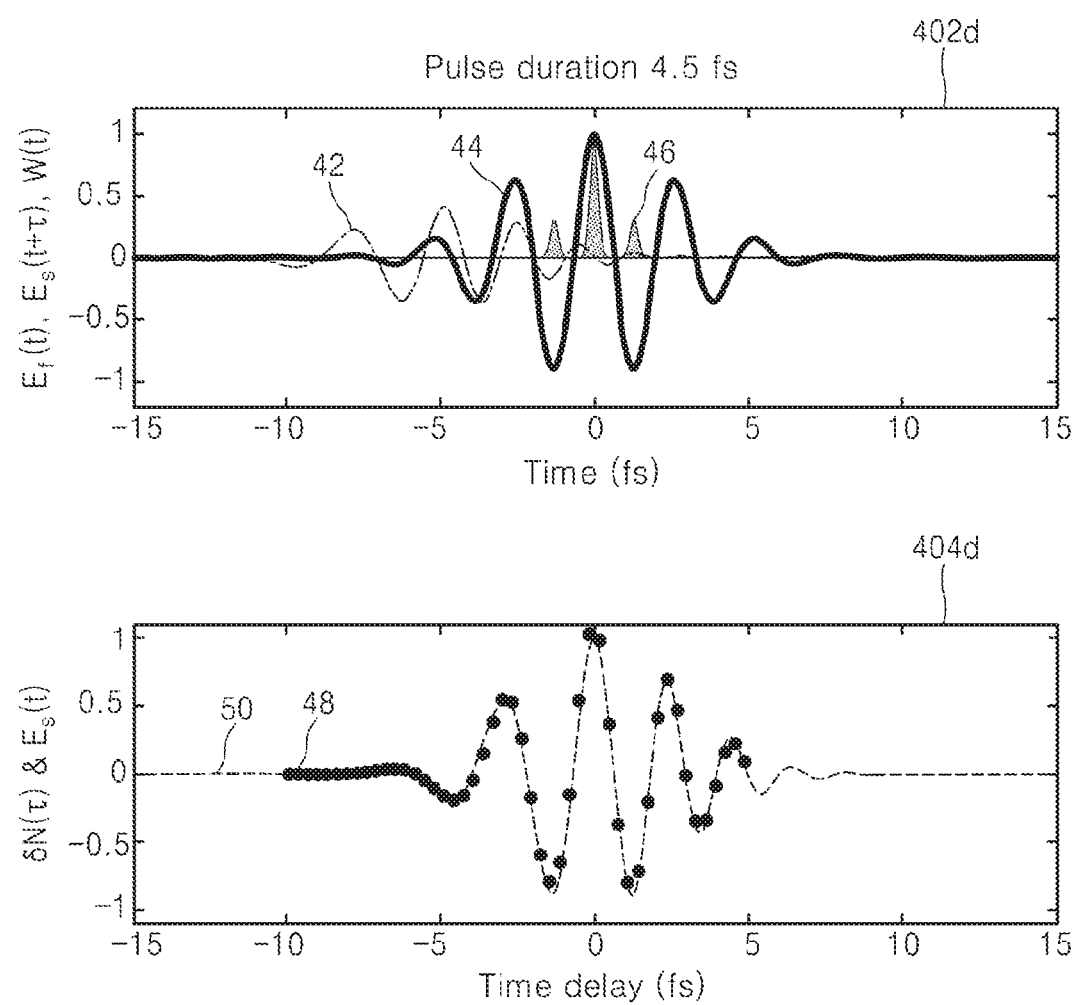
Figure 10:
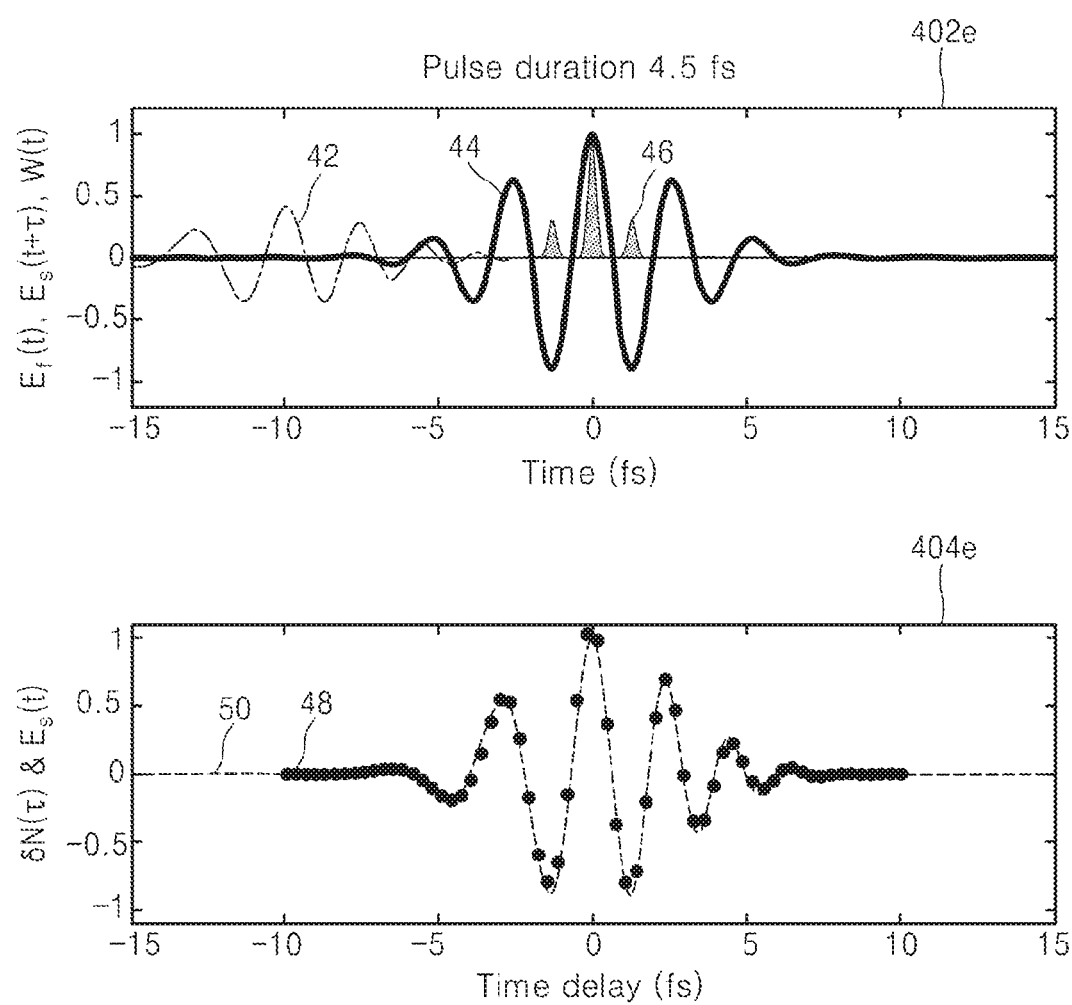

FIG. 5 is a configuration diagram of an ionization yield measurement unit when a metal nanostructure is used as an ionization material in an embodiment of the present invention.

In the embodiment shown in FIG. 5, a substrate 82 having a metal nanostructure 84 in a focus region 62 is disposed. As in the present embodiment, when using the metal nanostructure 84, since the strength of the electric field in the nanostructure increases, it is more advantageous for electron or ion formation. As shown in FIG. 5, when a metal nanomaterial is used, the electrode 41 may be formed as the nanostructure.

For reference, in addition to the embodiments shown in FIGS. 3 to 5, other materials known to react with light waves to cause ionization may also be used as the ionization material of the present invention.

Referring again to FIG. 2, the light wave measurement apparatus of the present invention acquires the waveform of the input light wave by measuring the ionization yield measured by the ionization yield measurement unit 214 as a function of the time delay.

The process of obtaining the waveform of the light wave in the present invention will be described in more detail as follows.

The ionization yield N(τ) generated when the fundamental pulse F(t−τ) and the signal pulse S(t) react with the ionization material in the focus region (24) is obtained by [Equation 1]. For reference, in [Equation 1], the ionization yield is assumed to be sufficiently small and the depletion of the ground state of the material is not considered. Herein, w(t) is the ionization rate (probability of ionization per unit time) of the ionization material present in the focus region 24.

$$N(\tau) = \int_{-\infty}^{+\infty} w[E_F(t-\tau) + E_s(t)]dt \qquad \text{[Equation 1]}$$

In [Equation 1], $E_F(t-\tau)$ is the electric field strength of the fundamental pulse F(t−τ) and $E_s(t)$ is the electric field strength of the signal pulse S(t).

However, as described above, the field strength of the signal pulse S(t) is controlled by the pulse separation unit 202 and the pulse control unit 208 so that the field strength of the signal pulse S(t) is weaker than that of the fundamental pulse F(t−τ). Thus, [Equation 1] may be approximated as in [Equation 2].

$$N(\tau) = \int_{-\infty}^{+\infty} g(t-\tau)E_s(t)dt \qquad \text{[Equation 2]}$$

In [Equation 2], $N_0$ represents the ionization yield generated by only the fundamental pulse F(t−τ) without the signal pulse S(t).

Furthermore, g(t), as the derivative of the ionization rate with respect to the field strength of the fundamental pulse F(t−τ), is $$g(t-\tau) = \frac{dw}{dE}\bigg|_{E=E_F(t-\tau)}.$$

Consequently, the ionization yield modulation δN(τ) changed by the signal pulse S(t) as a function of the time delay τ may be expressed as [Equation 3].

$$\delta N(\tau) = N(\tau) - N_0 = \int_{-\infty}^{+\infty} g(t-\tau)E_s(t)dt \qquad \text{[Equation 3]}$$

According to [Equation 3], the ionization yield modulation δN(τ) may be expressed by a cross-correlation function of the derivative value g(t−τ) of the ionization rate with respect to the electric field strength of the fundamental pulse F(t−τ), and the electric field strength $E_s(t)$ of the signal pulse S(t).

Here, the derivative g(t−τ) of the ionization rate of [Equation 3] may be expressed as a function of the fundamental pulse F(t−τ) using a known ionization model. Since the fundamental pulse F(t−τ) and the signal pulse S(t) are separated from the same input light wave LW(t), the fundamental pulse F(t−τ) may be known from the signal pulse S(t) by using the dispersion relationship of the two pulses. As a result, since the integration of [Equation 3] may be expressed as a function of only the signal pulse S(t), it is possible to find the waveform of the signal pulse S(t) from the ionization yield modulation δN(τ).

Here, the waveform of the signal pulse S(t) obtained by [Equation 3] refers to the waveform of the signal pulse S(t) in the region where it reacts with the ionization material. The waveform of the signal pulse S(t) in the region of reaction with the ionization material, the waveform of the fundamental pulse F(t−τ) in the region of reaction with the ionization material, and the waveform of the input light wave LW (t) may have different shapes according to the dispersion relation given in each embodiment. In consideration of the dispersion relation given in each embodiment, it is apparent to those skilled in the art that the fundamental pulse F(t−τ) and the input light wave LW(t) can be obtained from the obtained signal pulse S(t). Therefore, the light wave measurement apparatus of the present invention may obtain the waveform of the input light wave LW(t) from the waveform of the signal pulse S(t) obtained from the ionization yield modulation δN(τ) changed by the signal pulse S(t).

Also, as described above, the waveform of the fundamental pulse F(t−τ) that reacts with the ionization material may be obtained from the waveform of the signal pulse S(t) that reacts with the ionization material, calculated from [Equation 3]. Therefore, the pulse duration of the fundamental pulse F(t−τ) reacting with the ionization material may be obtained from the waveform of the fundamental pulse F(t−τ). If the pulse duration of the fundamental pulse F(t−τ) reacting with the ionization material is less than 2.5 times the transform-limited pulse duration (ΔTL) of the fundamental pulse F(t−τ), [Equation 3] approximates more simply as in [Equation 4].

$$\delta N(\tau) \propto E_s(\tau) \qquad \text{[Equation 4]}$$

Therefore, when the pulse duration of the fundamental pulse F(t−τ) reacting with the ionization material is less than 2.5 times the transform-limited pulse duration (ΔTL) of the fundamental pulse, the light wave measurement apparatus of the present invention may calculate the waveform of the signal pulse S(t), according to [Equation 4]. Herein, the transform-limited pulse duration ΔTL is the shortest pulse duration that may be obtained from the spectrum of a given light wave. In the present invention, the use of [Equation 4] is set to a case where the pulse duration of the fundamental pulse is 2.5 times or less the transform-limited pulse duration ΔTL of the fundamental pulse. However, depending on the embodiment, the criterion for determining whether to use [Equation 4] may be set differently.

In addition, even if the pulse duration of the fundamental pulse exceeds 2.5 times the transform-limited pulse duration ΔTL of the fundamental pulse, [Equation 4] may be applied after controlling the dispersion of the fundamental pulse to make the pulse duration of the fundamental pulse 2.5 times less than the transform-limited pulse duration ΔTL of the fundamental pulse.

Also, as described above, the light wave measurement apparatus of the present invention acquires the waveform of the input light wave using the dispersion relationship of the signal pulse S(t) and the input light wave LW(t).

It is also apparent to those skilled in the art that information on light waves such as amplitude, phase, chirp, and pulse duration may be obtained from the waveform of the obtained input light wave in the time domain and frequency domain of the input light wave.

In addition, the carrier envelope phase (CEP) of the signal pulse S(t) measured in the present invention should be interpreted as a relative phase with respect to the CEP of the fundamental pulse F(t). Therefore, the CEP of the measured signal pulse S(t) may be different from the actual value when the CEP of the fundamental pulse F(t) is not set to zero.

In the above, although an embodiment is described in which the time delay τ of the fundamental pulse F(t) and the signal pulse S(t) is adjusted by delaying the fundamental pulse F(t) by the time delay τ, the same result may be obtained even using the fundamental pulse F(t) and the time-delayed signal pulse S(t+τ) by delaying the signal pulse S(t) by the time delay τ.

FIGS. 6 to 10 are graphs illustrating a process of obtaining a waveform of an input light wave from an ionization yield modulation measured as a function of a time delay, in an embodiment of the present invention.

As described above, in the present invention, the ionization yield modulation δN(τ) may be expressed by a cross-correlation function of the ionization ratio w(t) with respect to the electric field strength of the fundamental pulse F(t), and the electric field strength $E_s(t)$ of the signal pulse S(t). FIGS. 6 to 10 illustrate a process of obtaining a waveform of a signal pulse as a function of the time delay of the fundamental pulse and the signal pulse through the cross-correlation function.

For example, as shown in the graphs 402a to 402e of FIGS. 6 to 10, by calculating the ionization rate w(t) 46 when the fundamental pulse 44 is overlapped while moving the signal pulse 42 from right to left, if the value of the ionization yield modulation δN(τ) 48 obtained as a function of the time delay is displayed in the graphs 404a to 404e, a waveform 50 of the signal pulse S(t) can be obtained.

Figure 11:
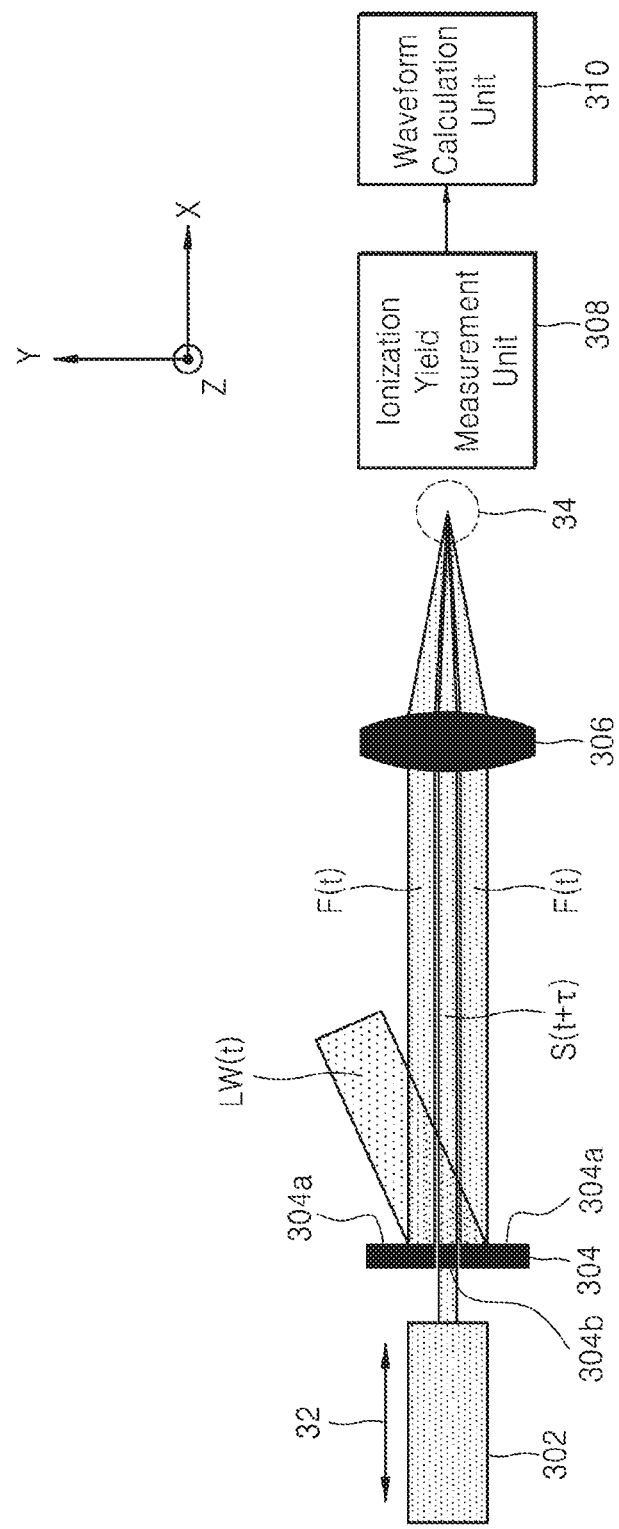
FIG. 11 is a configuration diagram of a light wave measurement apparatus according to another embodiment of the present invention.

FIG. 11 is a configuration diagram of a light wave measurement apparatus according to another embodiment of the present invention.

Figure 12:
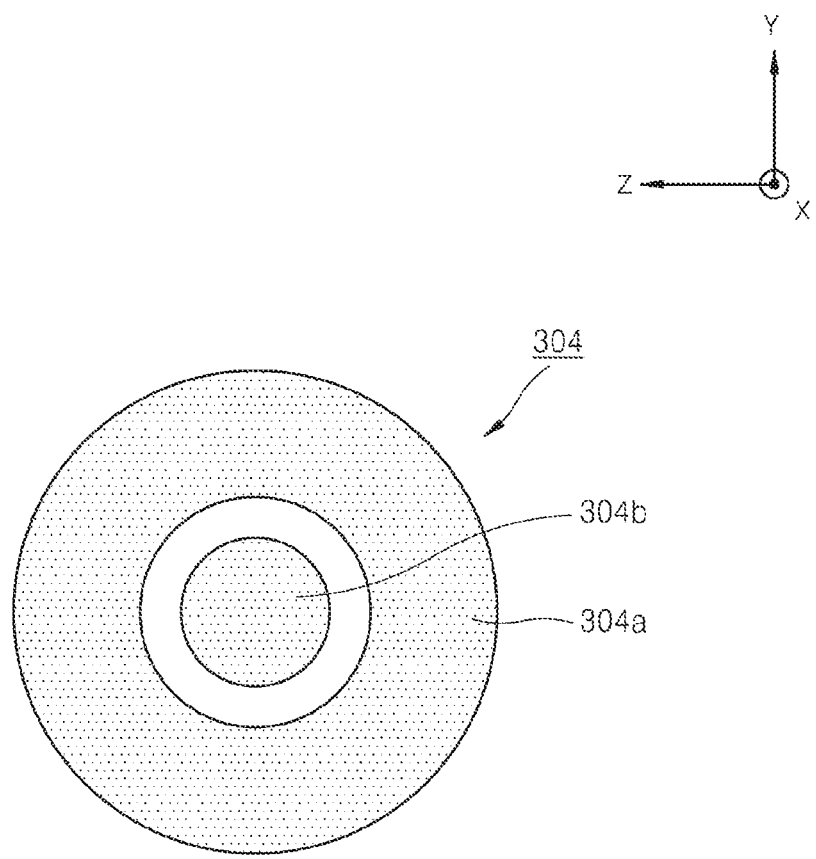
FIG. 12 is a front view of a pulse separation unit shown in FIG. 11.

Referring to FIG. 11, an input light wave LW(t) is incident on a pulse separation unit 304 and separated into a fundamental pulse F(t) and a signal pulse S(t). FIG. 12 is a front view of the pulse separation unit 304 shown in FIG. 11. Referring to FIGS. 11 and 12, the pulse separation unit 304 has a first region 304a and a second region 304b. The fundamental pulse F(t) and the signal pulse S(t) may be separated because an empty space is formed between the first region 304a and the second region 304b.

In the present invention, the second region 304b has a smaller surface area than the first region 304a. This is because the surface areas of the first region 304a and the second region 304b determine the field strength of the fundamental pulse F(t) and the signal pulse S(t), respectively. In the present invention, the surface area of the second region 304b may be set so that the field strength of the signal pulse S(t) generated in the second region 304b is between the minimum ratio and the maximum ratio of the field strength of the fundamental pulse F(t). For reference, the first region 304a and the second region 304b may have shapes other than circular shapes as shown in FIG. 12. The position of the second region 304b may also vary according to the embodiment.

Meanwhile, the second region 304b is connected to the time delay adjustment unit 302 as shown in FIG. 11. The time delay adjustment unit 302 delays the signal pulse S(t) by the time delay τ by moving the second region 304b along the direction of the arrow 32. Here, the time delay τ may be determined according to the moving direction and the moving length of the second region 304b.

Referring again to FIG. 11, the fundamental pulse F(t) and the signal pulse S(t+τ) generated by the pulse separation unit 304 are incident on the focusing unit 306. The fundamental pulse F(t) and the signal pulse S(t+τ) focused on the focus region 34 by the focusing unit 306 react with the ionization material present in the focus region 34 to generate electrons and/or ions.

The ionization yield measurement unit 308 measures an ionization yield in the focus region 34 from the electrons and/or ions generated by the fundamental pulse F(t) and the signal pulse S(t+τ). Then, the light wave measurement apparatus of the present invention acquires the waveform of the input light wave LW(t) from the ionization yield modulation δN(τ) obtained by the ionization yield measurement unit 308.

Figure 13:
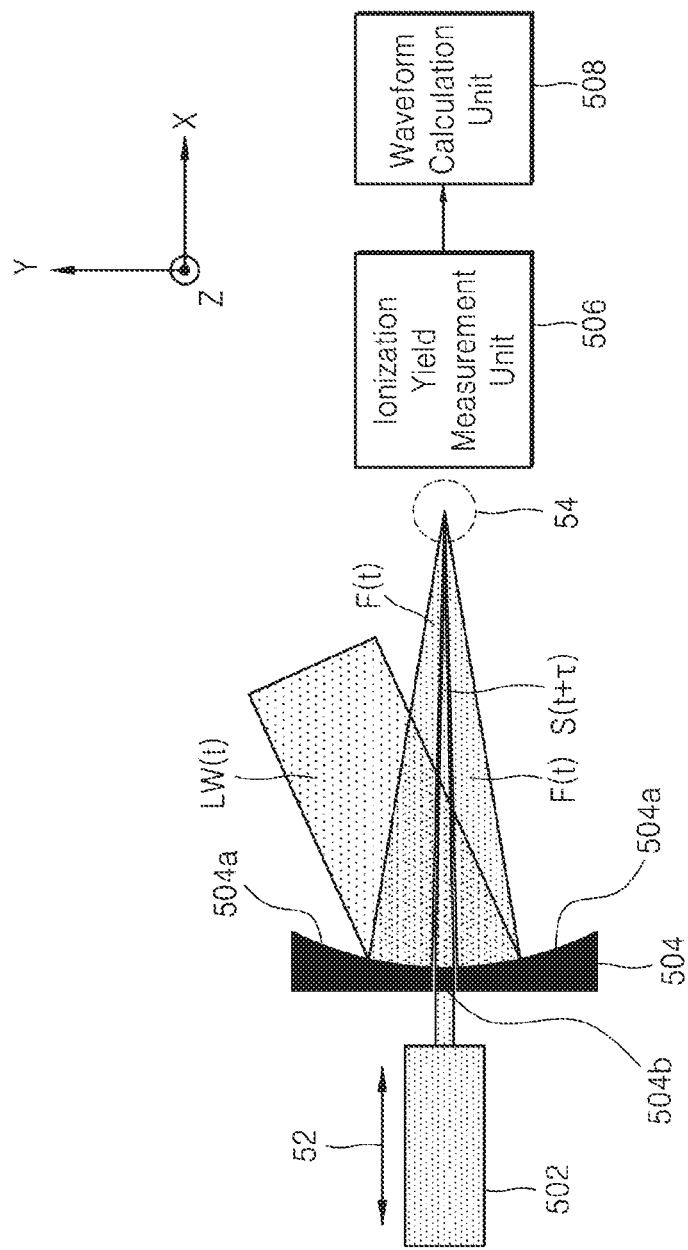
FIG. 13 is a configuration diagram of a light wave measurement apparatus according to another embodiment of the present invention.

FIG. 13 is a configuration diagram of a light wave measurement apparatus according to another embodiment of the present invention.

Referring to FIG. 13, an input light wave LW(t) is incident on a pulse separation unit 504 and separated into a fundamental pulse F(t) and a signal pulse S(t). In the embodiment of FIG. 13, a focusing lens having apertures in some regions and a focusing lens included therein are used as a pulse separation unit 504. The pulse separation unit 504 reflects the input light wave LW(t) to generate the fundamental pulse F(t) and the signal pulse S(t).

The pulse separation unit 504 shown in FIG. 13 includes a first region 504a and a second region 504b. The cross section of the pulse separation unit 504 may be formed as shown in FIG. 12. Also, as described above, the second region 504b has a smaller surface area than the first region 504a. This is because the surface areas of the first region 504a and the second region 504b determine the field strength of the fundamental pulse F(t) and the signal pulse S(t), respectively. In the present invention, the surface area of the second region 504b may be set so that the field strength of the signal pulse S(t) generated in the second region 504b is between the minimum ratio and the maximum ratio of the field strength of the fundamental pulse F(t).

Meanwhile, the second region 504b is connected to the time delay adjustment unit 502 as shown in FIG. 13. The time delay adjustment unit 502 delays the signal pulse S(t) by the time delay τ by moving the second region 504b along the direction of the arrow 52. Here, the time delay τ may be determined according to the moving direction and the moving length of the second region 504b.

Referring again to FIG. 13, the fundamental pulse F(t) and the signal pulse S(t+τ) generated by the pulse separation unit 504 are incident on the focusing region 54. That is, in the embodiment of FIG. 13, since the pulse separation unit 504 has a function for focusing the fundamental pulse F(t) and the signal pulse S(t+τ), it is not necessary to provide the focusing unit 306 separately as shown in FIG. 11.

The ionization yield measurement unit 506 measures an ionization yield in the focus region 54 from the electrons and/or ions generated by the fundamental pulse F(t) and the signal pulse S(t+τ). The light wave measurement apparatus of the present invention acquires the waveform of the input light wave LW(t) from the ionization yield modulation obtained as a function of the time delay by the ionization yield measurement unit 506.

Figure 14:
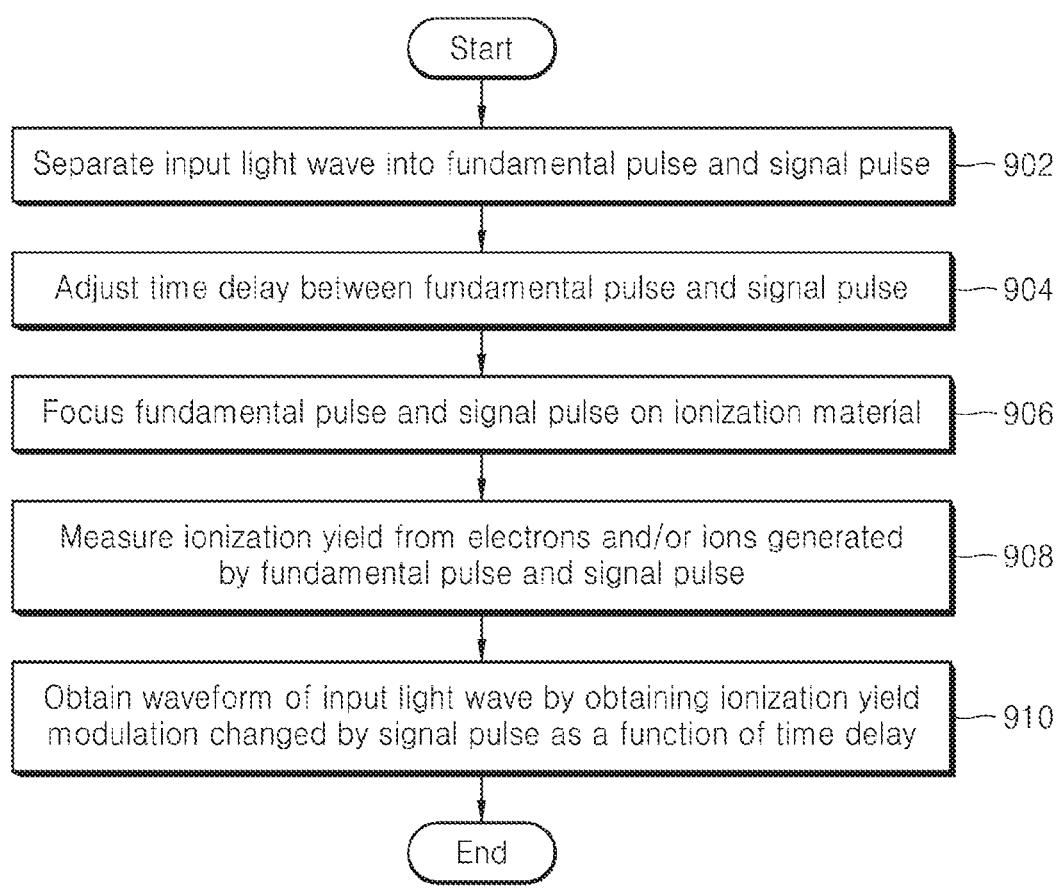
FIG. 14 is a flowchart of a light wave measurement method according to an embodiment of the present invention.

FIG. 14 is a flowchart of a light wave measurement method according to an embodiment of the present invention.

Referring to FIG. 14, the light wave measurement apparatus of the present invention first separates an input light wave into a fundamental pulse and a signal pulse (902). At this time, the field strength of the signal pulse is between the minimum and the maximum ratio of the fundamental pulse strength.

Next, the light wave measurement apparatus adjusts the time delay between the fundamental pulse and the signal pulse (904). Next, the light wave measurement apparatus focuses the time-delayed fundamental pulse and the signal pulse on an ionization material (906). Next, the light wave measurement apparatus measures the ionization yield from electrons and/or ions generated by the focused fundamental and signal pulses (908). Thereafter, the light wave measurement apparatus acquires the waveform of the input light wave by obtaining the ionization yield modulation changed by the signal pulse as a function of the time delay (910).

In the above description, the method of measuring the waveform of the signal pulse from the ionization yield modulation measured with the time delay using the fundamental pulse and the signal pulse has been described but it is assumed here that the ionization yield $N_0$ ionized by only the fundamental pulse is a constant.

However, according to the embodiment, the field strength of the fundamental pulse may change with time due to the influence of the surrounding environment. In this case, a value of the ionization yield $N_0$ ionized only by the fundamental pulse changes with time delay and becomes $N_0(\tau)$. Therefore, it is difficult to measure the ionization yield modulation δN(τ) changed by the signal pulse S(t).

Hereinafter, an embodiment in which a differential measurement is applied to solve this problem will be described with reference to FIGS. 15 and 16.

Figure 15:
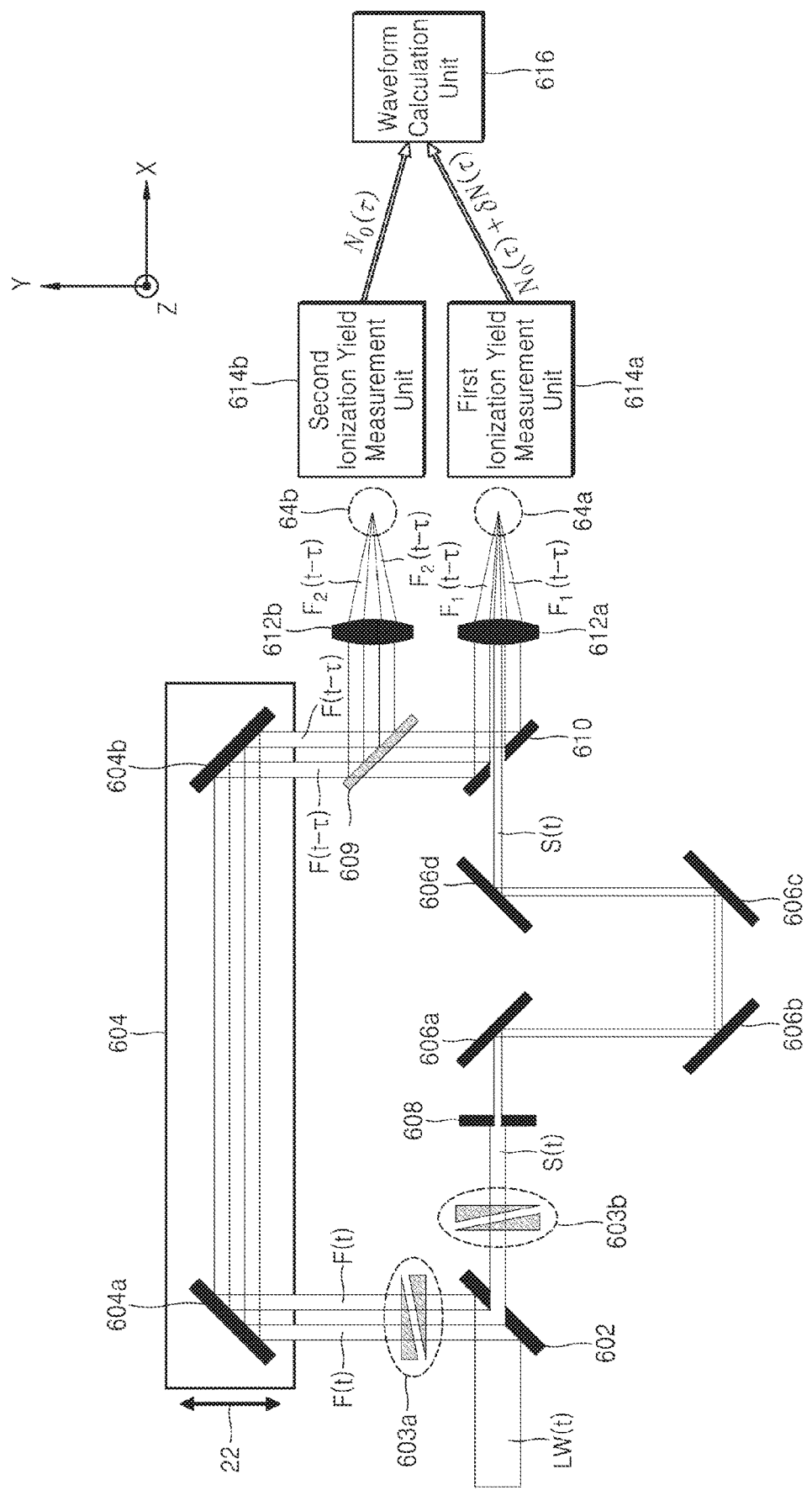
FIG. 15 is a configuration diagram of a light wave measurement apparatus according to another embodiment of the present invention.

FIG. 15 is a configuration diagram of a light wave measurement apparatus to which a differential measurement according to another embodiment of the present invention is applied.

Referring to FIG. 15, an input light wave LW(t) is incident on a pulse separation unit 602 and separated into a fundamental pulse and a signal pulse. Depending on the embodiment, dispersion of the fundamental pulse and/or the signal pulse may be adjusted by the dispersion adjustment units 603a and 603b. Depending on the embodiment, the pulse strength adjustment unit 608 adjusts the field strength of the signal pulse.

The signal pulse is reflected by a first mirror 606a, a second mirror 606b, a third mirror 606c, and a fourth mirror 606d. The time delay of the fundamental pulse is adjusted by the time delay adjustment unit 604. In FIG. 15, functions of the pulse separation unit 602, the dispersion adjustment units 603a and 603b, the pulse strength adjustment unit 608, the first mirror 606a, the second mirror 606b, the third mirror 606c, the fourth mirror 606d, and the time delay adjustment unit 604 are the same as the embodiment of FIG. 2.

The fundamental pulse provided from the time delay adjustment unit 604 is separated into a first fundamental pulse $F_1(t-\tau)$ and a second fundamental pulse $F_2(t-t)$ by the first pulse separation unit 609. At this time, the first fundamental pulse $F_1(t-\tau)$ and the second fundamental pulse $F_2(t-\tau)$ may be separated into the same shape and field strength. If necessary, a dispersion adjustment unit (not shown) may be further provided to compensate for the dispersion difference between the fundamental pulse generated by the first pulse separation unit 609 and the signal pulse.

The path of the separated first fundamental pulse $F_1(t-\tau)$ and the signal pulse S(t) reflected by the fourth mirror 606d corresponds to the path of the first fundamental pulse $F_1(t-\tau)$ by the pulse coupling unit 610. The corresponding first fundamental pulse $F_1(t-\tau)$ and the signal pulse S(t) are focused on the focus region 64a having a first ionization material by the first focusing unit 612a.

The first ionization yield measurement unit 614a measures the ionization yield $N_0(\tau)+\delta N(\tau)$ as a function of the time delay based on the magnitude of the current generated from the electrons and/or ions generated from the first ionization material by the focused first fundamental pulse $F_1(t-\tau)$ and the signal pulse $S(t)$.

On the other hand, the separated second fundamental pulse $F_2(t-\tau)$ is focused on the focus region 64b having the second ionization material by the second focusing unit 612b. The second ionization yield measurement unit 614b measures the ionization yield $N_0(\tau)$ as a function of the time delay based on the magnitude of the current generated from the electrons and/or ions generated from the second ionization material by the focused second fundamental pulse $F_2(t-\tau)$.

Using the ionization yield $N_0(\tau)+\delta N(\tau)$ measured in the first ionization yield measurement unit 614a and the ionization yield $N_0(\tau)$ measured in the second ionization yield measurement unit 614b, it is possible to reduce the influence of $N_0(\tau)$ that changes as a function of time delay. For example, the normalized ionization yield modulation, i.e., $\delta N(\tau)/N_0(\tau)$, may be obtained by calculating $((N_0(\tau)+\delta N(\tau))/N_0(\tau)-1)$.

When the field strength of the input light wave changes with time delay due to the influence of the environmental modulation, $\delta N(\tau)$ and $N_0(\tau)$ change together. When the normalized ionization yield modulation $\delta N(\tau)/N_0(\tau)$ is calculated using the ionization yield $N_0(\tau)+\delta N(\tau)$ measured in the first ionization yield measurement unit 614a and the ionization yield $N_0(\tau)$ measured in the second ionization yield measurement unit 614b, the waveform of the input light wave may be obtained more stably because the influence of the change of the surrounding environment is canceled. That is, the normalized ionization yield modulation $\delta N(\tau)/N_0(\tau)$ is substituted for $\delta N(\tau)$ in the left side of [Equation 3] or [Equation 4] so that the waveform of the signal pulse may be obtained in the same manner as described above. Thus, the light wave measurement apparatus of the present invention calculates the normalized ionization yield modulation $\delta N(\tau)/N_0(\tau)$ to obtain the waveform of the signal pulse by using the ionization yield $N_0(\tau)+\delta N(\tau)$ measured in the first ionization yield measurement unit 614a and the ionization yield $N_0(\tau)$ measured in the second ionization yield measurement unit 614b.

Figure 16:
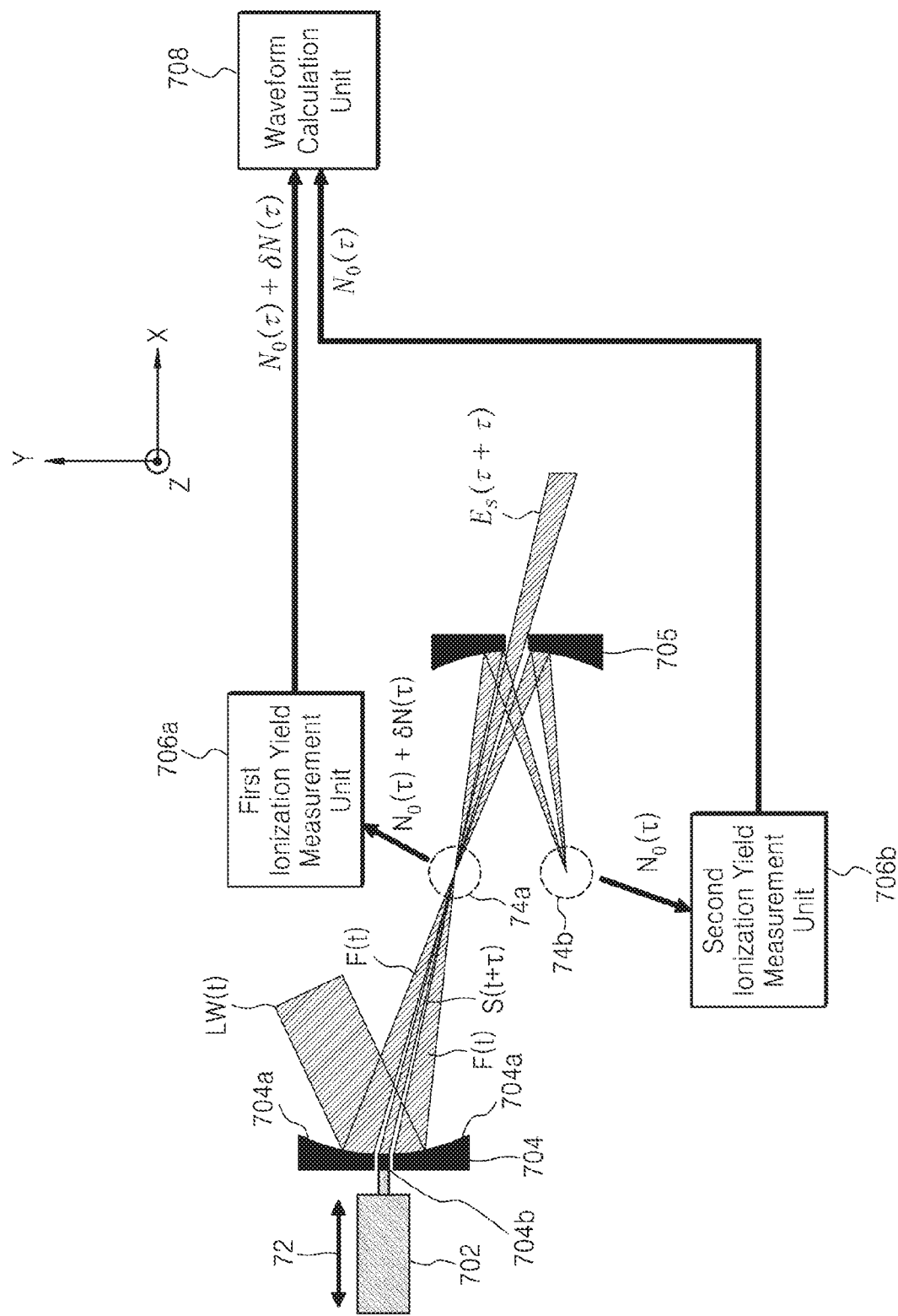
FIG. 16 is a configuration diagram of a light wave measurement apparatus according to another embodiment of the present invention.

FIG. 16 is a configuration diagram of a light wave measurement apparatus to which a differential measurement according to another embodiment of the present invention is applied.

Referring to FIG. 16, an input light wave LW(t) is incident on a pulse separation unit 704 and separated into a fundamental pulse F(t) and a signal pulse S(t). At this time, the time delay adjustment unit 702 adjusts the time delay of the signal pulse S(t). As a result, the time-delayed signal pulse S(t+τ) and the fundamental pulse F(t) are focused on the focus region 74a having the first ionization material by the pulse separation unit 704.

The first ionization yield measurement unit 706a measures the ionization yield $N_0(\tau)+\delta N(\tau)$ as a function of the time delay from the electrons and/or ions generated in the first ionization material by the fundamental pulse F(t) and the signal pulse S(t−τ).

The fundamental pulse and the signal pulse that pass the region where the first ionization material is present will again grow. At this time, only the fundamental pulse is selectively focused on the focus region 74b having the second ionization material by the second focusing unit 705. The second ionization yield measurement unit 706b measures the ionization yield $N_0(\tau)$ as a function of the time delay from the electrons and/or ions generated only by the focused fundamental pulse.

When the field strength of the light wave changes with time delay due to the influence of the environmental change, $\delta N(\tau)$ and $N_0(\tau)$ change together. When the normalized ionization yield modulation $\delta N(\tau)/N_0(\tau)$ is calculated using the ionization yield $N_0(\tau)+\delta N(\tau)$ measured in the first ionization yield measurement unit 706a and the ionization yield $N_0(\tau)$ measured in the second ionization yield measurement unit 706b, it is possible to measure more stable light wave by canceling the influence of environmental change. Thus, the light wave measurement apparatus of the present invention calculates the normalized ionization yield modulation $\delta N(\tau)/N_0(\tau)$ to obtain the waveform of the signal pulse by using the ionization yield $N_0(\tau)+\delta N(\tau)$ measured in the first ionization yield measurement unit 706a and the ionization yield $N_0(\tau)$ measured in the second ionization yield measurement unit 706b.

Figure 17:
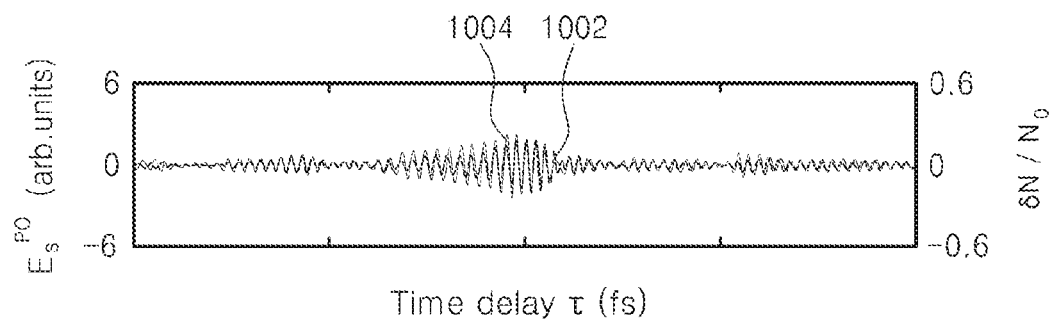
FIG. 17 is a graph showing the measurement values of ultra-short laser pulses measured according to the prior art and the method of the present invention.
Figure 18:
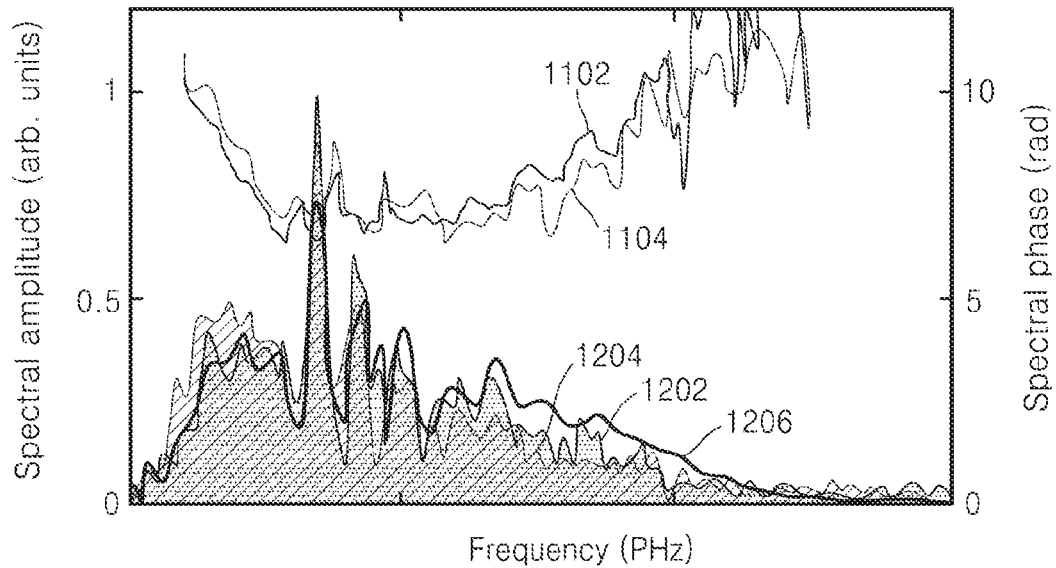
FIG. 18 is a graph showing the amplitude and phase values of the spectrum calculated from the measurement values shown in FIG. 17.

FIG. 17 is a graph showing the waveform of the ultra-short laser pulse measured using the prior art (petahertz optical oscilloscope method) and that of the ultra-short laser pulse measured according to the method of the present invention. FIG. 18 is a graph showing the amplitude and phase values of the spectrum calculated from the measurement values shown in FIG. 17.

For reference, the experimental results of FIGS. 17 and 18 were obtained using an ultra-short laser pulse having a center wavelength of 730 nanometers (nm) and a pulse duration of 5 femtoseconds (fs) as an input light wave and using a 5 mbar pressure xenon gas as an ionization material. In addition, the fundamental pulse strength is $1\times10^{13}$ W/cm$^2$, and the electric field strength of the signal pulse is 3% of the electric field strength of the fundamental pulse.

In FIG. 17, the waveform 1002 of the ultra-short laser pulse measured by the light wave measuring method according to the present invention and the waveform 1004 of the ultra-short laser pulse measured according to the prior art are respectively shown. In FIG. 18, the amplitude 1202 and phase 1102 of the spectrum of the waveform 1002 measured by the light wave measuring method of the present invention and the amplitude 1204 and phase 1104 of the spectrum of the waveform 1004 measured according to the prior art are respectively shown. Also, in FIG. 18, the amplitude 1206 of the spectrum measured with a grating spectrometer for comparison is shown.

As shown in FIGS. 17 and 18, even if the same laser pulse is measured by the light wave measuring method according to the present invention, a result almost similar to that of the prior measuring methods may be obtained.

As a result, according to the present invention, it is possible to accurately measure the waveform of a light wave with a simple configuration and without the constraints of the prior art.

The present invention is not limited to the above-described embodiment and the accompanying drawings, because various substitutions, modifications, and changes are possible by those skilled in the art without departing from the technical spirit of the present invention.

The invention claimed is:
1. A light wave measurement apparatus comprising:
a pulse separation unit configured to separate an input light wave into a fundamental pulse having a first electric field strength and a signal pulse having a second electric field strength, the first electric field strength being stronger than the second electric field strength, the first electric field strength and the second electric field strength having a certain ratio therebetween;
a time delay adjustment unit configured to adjust a time delay between the fundamental pulse and the signal pulse;
a focusing unit configured to focus the fundamental pulse and the signal pulse on an ionization material;
an ionization yield measurement unit configured to measure an ionization yield generated in the ionization material and obtain an ionization yield modulation changed by the signal pulse as a function of the time delay; and
a waveform calculation unit configured to calculate a waveform of the input light wave based on the ionization yield modulation.

2. The light wave measurement apparatus of claim 1, wherein the pulse separation unit is configured to separate the input light wave into the fundamental pulse and the signal pulse such that the second electric field strength of the signal pulse is 0.1%~20% of the first electric field strength of the fundamental pulse.

3. The light wave measurement apparatus of claim 1, further comprising:
a pulse strength adjustment unit configured to adjust the first electric field strength of the fundamental pulse and/or the second electric field strength of the signal pulse to have the certain ratio.

4. The light wave measurement apparatus of claim 1, wherein the ionization material includes a gas, a metal, or a nanostructure disposed on a substrate.

5. A light wave measurement apparatus comprising:
a pulse separation unit configured to separate an input light wave into a fundamental pulse having a first electric field strength and a signal pulse having a second electric field strength, the first electric field strength being stronger than the second electric field strength, the first electric field strength and the second electric field strength having a certain ratio therebetween;
a time delay adjustment unit configured to adjust a time delay between the fundamental pulse and the signal pulse;
an ionization yield measurement unit configured to measure an ionization yield generated in an ionization material which is focused by the fundamental pulse and the signal pulse, and obtain an ionization yield modulation changed by the signal pulse as a function of the time delay; and
a waveform calculation unit configured to calculate a waveform of the input light wave based on the ionization yield modulation.

6. The light wave measurement apparatus of claim 5, wherein the pulse separation unit is configured to separate the input light wave into the fundamental pulse and the signal pulse such that the second electric field strength of the signal pulse is 0.1%~20% of the first electric field strength of the fundamental pulse.

7. The light wave measurement apparatus of claim 5, further comprising:
a focusing unit configured to focus the fundamental pulse and the signal pulse on the ionization material.

8. The light wave measurement apparatus of claim 5, further comprising:
a pulse strength adjustment unit configured to adjust the first electric field strength of the fundamental pulse and/or the second electric field strength of the signal pulse to have the certain ratio.

9. The light wave measurement apparatus of claim 5, wherein the pulse separation unit comprises a first region and a second region, the first region configured to reflect a portion of the input light wave to generate the signal pulse, and the second region configured to reflect a portion of the input light wave to generate the fundamental pulse.

10. The light wave measurement apparatus of claim 9, wherein a surface area of the first region is smaller than that of the second region.

11. The light wave measurement apparatus of claim 9, wherein the second region surrounds the first region.

12. The light wave measurement apparatus of claim 9, wherein the time delay adjustment unit is further configured to adjust the time delay by moving a position of the first region or the second region.

13. A light wave measurement apparatus comprising:
a pulse separation unit configured to,
separate an input light wave into a fundamental pulse and a signal pulse, and
focus the fundamental pulse and the signal pulse on a first ionization material;
a time delay adjustment unit configured to adjust a time delay between the fundamental pulse and the signal pulse;
a first ionization yield measurement unit configured to measure a first ionization yield in the first ionization material which is focused by the fundamental pulse and the signal pulse;
a focusing unit configured to focus only the fundamental pulse on a second ionization material; and
a second ionization yield measurement unit configured to measure a second ionization yield in the second ionization material which is focused by only the fundamental pulse.

14. The light wave measurement apparatus of claim 13, wherein the first ionization yield measurement unit is configured to measure the first ionization yield of $N_0+\delta N(\tau)$ and the second ionization yield measurement unit is configured to measure the second ionization yield of $N_0$,
where $\delta N(\tau)$ is an ionization yield modulation changed by the signal pulse as a function of the time delay of $\tau$, and $N_0$ is an ionization yield generated by only the fundamental pulse.

15. The light wave measurement apparatus of claim 14, further comprising:
a waveform calculation unit configured to obtain a waveform of the input light wave from the ionization yield modulation.

16. The light wave measurement apparatus of claim 13, wherein the pulse separation unit comprises a first region and a second region divided into each other,
the first region is configured to reflect a first portion of the input light wave to generate the signal pulse, and
the second region is configured to reflect a second portion of the input light wave to generate the fundamental pulse.

17. The light wave measurement apparatus of claim 16, wherein a surface area of the first region is smaller than that of the second region.

18. The light wave measurement apparatus of claim 16, wherein the time delay adjustment unit is further configured to adjust the time delay by moving a position of the first region or the second region.

* * * * *